United States Patent
Lee et al.

(10) Patent No.: US 11,452,093 B2
(45) Date of Patent: Sep. 20, 2022

(54) METHOD FOR INDICATING PREEMPTION IN A COMMUNICATION SYSTEM USING A BITMAP CORRESPONDING TO RESOURCES

(71) Applicant: ELECTRONICS AND TELECOMMUNICATIONS RESEARCH INSTITUTE, Daejeon (KR)

(72) Inventors: Jung Hoon Lee, Daejeon (KR); Jung Bin Kim, Seoul (KR); Cheul Soon Kim, Daejeon (KR); Sung Hyun Moon, Daejeon (KR); Choong Il Yeh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 274 days.

(21) Appl. No.: 16/644,721

(22) PCT Filed: Sep. 12, 2018

(86) PCT No.: PCT/KR2018/010673
§ 371 (c)(1),
(2) Date: Mar. 5, 2020

(87) PCT Pub. No.: WO2019/066318
PCT Pub. Date: Apr. 4, 2019

(65) Prior Publication Data
US 2020/0288463 A1 Sep. 10, 2020

(30) Foreign Application Priority Data

Sep. 29, 2017 (KR) .................. 10-2017-0128115
Nov. 14, 2017 (KR) .................. 10-2017-0151839

(51) Int. Cl.
*H04L 5/00* (2006.01)
*H04W 72/04* (2009.01)
(Continued)

(52) U.S. Cl.
CPC ....... *H04W 72/0446* (2013.01); *H04L 5/0035* (2013.01); *H04W 28/00* (2013.01);
(Continued)

(58) Field of Classification Search
CPC ..... H04L 12/5695; H04L 47/70; H04L 47/78; H04L 5/0035; H04L 47/822;
(Continued)

(56) References Cited

U.S. PATENT DOCUMENTS 8,706,149 B2  4/2014 Ha
9,037,151 B2  5/2015 Sennett et al.
(Continued)

OTHER PUBLICATIONS

R1-1715409, "On pre-emption indication for DL multiplexing of URLLC and eMBB", Sep. 18-21, 2017, pp. 1-15 (Year: 2017).*
(Continued)

*Primary Examiner* — Salvador E Rivas
(74) *Attorney, Agent, or Firm* — Rabin & Berdo, P.C.

(57) ABSTRACT

A method for indicating preemption in a communication system is disclosed. A method for operating a terminal comprises the steps of: receiving, from a base station, information indicating a first resource area, to which a preemption-capable resource belongs, for transmission of first data; receiving resource allocation information of second data from the base station; performing a monitoring operation for detecting a PI indicating a preempted resource for transmission of the first data in the first resource area, when the first resource area overlaps with a second resource area indicated by the resource allocation information; and performing decoding on the basis of the detected PI. There-
(Continued)

fore, the performance of the communication system may be improved.

17 Claims, 27 Drawing Sheets

(51) Int. Cl.
    *H04W 76/27*     (2018.01)
    *H04W 28/00*     (2009.01)
    *H04W 72/12*     (2009.01)
    *H04L 47/70*     (2022.01)

(52) U.S. Cl.
    CPC ........... *H04W 72/04* (2013.01); *H04W 76/27* (2018.02); *H04L 47/822* (2013.01); *H04W 72/1263* (2013.01)

(58) Field of Classification Search
    CPC .... H04B 17/382; H04W 28/00; H04W 72/04; H04W 72/1263
    See application file for complete search history.

(56) References Cited

U.S. PATENT DOCUMENTS

| | | | |
|---|---|---|---|
| 9,516,652 | B2 | 12/2016 | Fodor et al. |
| 2013/0171934 | A1 | 7/2013 | Stankovska et al. |
| 2016/0113008 | A1 | 4/2016 | Damnjanovic et al. |
| 2016/0205664 | A1 | 7/2016 | Zhang et al. |
| 2016/0295584 | A1 | 10/2016 | Chen et al. |
| 2017/0013608 | A1 | 1/2017 | Du et al. |
| 2017/0181169 | A1 | 6/2017 | Choi |
| 2019/0141647 | A1* | 5/2019 | Nimbalker ............ H04L 5/0048 |
| 2019/0268930 | A1* | 8/2019 | Rudolf .............. H04W 72/1242 |

OTHER PUBLICATIONS

Huawei et al., "On Pre-emption Indication for DL Multiplexing of URLLC and eMBB", R1-1715409, 3GPP TSG RAN WG1 Ad Hoc Meeting, Nagoya, Japan, Sep. 9, 2017.

Intel Corp., "Multiplexing of Different Data Channel Durations", R1-1716325, 3GPP TSG RAN WG1 Meeting NR#3, Nagoya, Japan, Sep. 12, 2017.

Sony, "Remaining Issues on Using Pre-emption Indicator for DL URLLC/eMBB Multiplexing", R1-1710865, 3GPP TSG RAN WG1 NR Ad-Hoc#2, Qingdao, P.R. China, Jun. 16, 2017.

Wilus Inc., "Discussion on UE Behavior by Pre-emption Indication", R1-1716636, 3GPP TSG RAN WG1 Meeting NR#3, Nagoya, Japan, Sep. 12, 2017.

\* cited by examiner

METHOD FOR INDICATING PREEMPTION IN A COMMUNICATION SYSTEM USING A BITMAP CORRESPONDING TO RESOURCES

TECHNICAL FIELD

The present invention relates to a technique for indicating preemption in a communication system, and more particularly, to a technique for indicating a preempted time-frequency resource.

BACKGROUND ART

A communication system (hereinafter, a new radio (NR) communication system) using a higher frequency band (e.g., a frequency band of 6 GHz or higher) than a frequency band (e.g., a frequency band lower below 6 GHz) of a long term evolution (LTE) based communication system (or, a LTE-A based communication system) is being considered for processing of soaring wireless data. The NR system may support not only the frequency band below 6 GHz but also the frequency band above 6 GHz, and may support various communication services and scenarios compared to the LTE system. Further, the requirements of the NR system may include enhanced Mobile BroadBand (eMBB), Ultra Reliable Low Latency Communication (URLLC), massive Machine Type Communication (mMTC), and the like.

The data transmitted and received according to the requirements of the eMBB service may be referred to as 'eMBB data', and the data transmitted and received according to the requirements of the URLLC service may be referred to as 'URLLC data'. A base station may allocate resources (hereinafter referred to as 'eMBB resources') used for transmission and reception of the eMBB data, transmit allocation information of the eMBB resources to a terminal, and transmit the eMBB data to the terminal using the eMBB resources. When transmission of the URLLC data is required while the eMBB data is being transmitted, the base station may transmit the URLLC data instead of the eMBB data using some time-frequency resources among the eMBB resources. That is, some time-frequency resources among the eMBB resources may be preempted for the transmission of the URLLC data.

Meanwhile, the terminal may acquire the eMBB data by monitoring the eMBB resources allocated by the base station. However, if the terminal does not know that some time-frequency resources among the eMBB resources have been preempted for the transmission of the URLLC data, the decoding performance of the eMBB data may be degraded. In order to solve such the problem, there is a need for a method for informing the preempted time-frequency resources.

DISCLOSURE

Technical Problem

The present invention is directed to providing a method for indicating a preempted time-frequency resource in a communication system.

Technical Solution

An operation method of a terminal in a communication system, according to a first embodiment of the present invention for achieving the above-described objective, may comprise receiving from a base station information indicating a first resource region to which resources allowed to be preempted for transmission of a first data belong; receiving from the base station resource allocation information of a second data; when the first resource region overlaps with a second resource region indicated by the resource allocation information, performing a monitoring operation for detecting a preemption indication (PI) indicating a resource preempted for transmission of the first data in the first resource region; and in response to detecting the PI, performing decoding on the second data obtained through resources other than the preempted resource indicated by the PI in the second resource region.

Here, the PI may include a bitmap indicating the preempted resource in one slot, the one slot may be divided into N sub resource blocks, the bitmap may include N bits each of which indicates whether each of the N sub resource blocks is the preempted resource, and N may be an integer equal to or greater than 2.

Here, when the one slot includes 14 symbols, a configuration unit of each of the N sub resource blocks in time axis may be 1 symbol, 2 symbols, 4 symbols, or 7 symbols, and the PI may further include information indicating the configuration unit.

Here, the PI may include a bitmap indicating the preempted resource within M slots, each of the M slots may be divided into N sub resource blocks, the bitmap may include N×M bits each of which indicates whether each of the N sub resource blocks is the preempted resource in each of the M slots, and each of N and M may be an integer equal to or greater than 2.

Here, the PI may further include information indicating whether the preempted resource exist in each of the M slots.

Here, the PI may include a bitmap indicating the preempted resource within M slots, each of the M slots may be divided into N sub resource blocks, the bitmap may be expressed as a sum of M sub-bitmaps each of which indicates each of the N sub resource blocks is the preempted resource in each of the M slots, each of the M sub-bitmaps may include N bits each of which indicates each of the N sub resource blocks is the preempted resource, and each of N and M may be an integer equal to or greater than 2.

Here, the information indicating the first resource region may be received through a synchronization signal/physical broadcast channel (SS/PBCH) block or a radio resource control (RRC) message.

Here, the first resource region may be a frequency band comprising one or more physical resource blocks (PRBs) or one or more bandwidth parts (BWPs).

Here, the monitoring operation may be performed according to a preconfigured monitoring period, and information indicating the preconfigured monitoring period may be received from the base station.

Here, when a first subcarrier spacing of the preempted resource is different from a second subcarrier spacing of a resource in which the PI is detected, a time region of the preempted resource may be determined based on a ratio of the first subcarrier spacing and the second subcarrier spacing.

An operation method of a terminal in a communication system, according to a second embodiment of the present invention for achieving the above-described objective, may comprise receiving from a base station information indicating a first resource region to which resources allowed to be preempted for transmission of a first data belong; receiving from the base station a preemption resource (PR) indicating a pattern of the resources allowed to be preempted in the first resource region; receiving from the base station resource allocation information of a second data; when the first resource region overlaps with a second resource region indicated by the resource allocation information, performing a monitoring operation for detecting a preemption indication (PI) indicating whether a resource preempted for transmission of the first data is present in the first resource region; and when the PI is detected and the PI indicates that the preempted resource is present in the first resource region, performing decoding on the second data obtained through resources other than resources according to the pattern indicated by the PR in the second resource region.

Here, the PI may include a bitmap indicating the preempted resource in one slot, the one slot may be divided into N sub resource blocks, the bitmap may include N bits each of which indicates whether each of the N sub resource blocks is the preempted resource, and N may be an integer equal to or greater than 2.

Here, when the one slot includes 14 symbols, a configuration unit of each of the N sub resource blocks in time axis may be 1 symbol, 2 symbols, 4 symbols, or 7 symbols, and the PI may further include information indicating the configuration unit.

Here, the PI may further include information indicating a number of slots to which the PI is applied.

Here, the information indicating the first resource region may be received through a synchronization signal/physical broadcast channel (SS/PBCH) block or a radio resource control (RRC) message.

An operation method of a base station in a communication system, according to a third embodiment of the present invention for achieving the above-described objective, may comprise transmitting information indicating a first resource region to which resources allowed to be preempted for transmission of a first data belong; transmitting resource allocation information of a second data to a terminal; transmitting the second data to the terminal using a second resource region indicated by the resource allocation information, when the first resource region overlaps with the second resource region indicated by the resource allocation information and transmission of the first data is required, transmitting the first data using the resources allowed to be preempted in the first resource region; and transmitting to the terminal an preemption indication (PI) indicating a preempted resource for the transmission of the first data in the first resource region.

Here, the PI may include a bitmap indicating the preempted resource in one slot, the one slot may be divided into N sub resource blocks, the bitmap may include N bits each of which indicates whether each of the N sub resource blocks is the preempted resource, and N may be an integer equal to or greater than 2.

Here, when the one slot includes 14 symbols, a configuration unit of each of the N sub resource blocks in time axis may be 1 symbol, 2 symbols, 4 symbols, or 7 symbols, and the PI may further include information indicating the configuration unit.

Here, the PI may include a bitmap indicating the preempted resource within M slots, each of the M slots may be divided into N sub resource blocks, the bitmap may include N×M bits each of which indicates whether each of the N sub resource blocks is the preempted resource in each of the M slots, and each of N and M may be an integer equal to or greater than 2.

Here, the PI may include a bitmap indicating the preempted resource within M slots, each of the M slots may be divided into N sub resource blocks, the bitmap may be expressed as a sum of M sub-bitmaps each of which indicates each of the N sub resource blocks is the preempted resource in each of the M slots, each of the M sub-bitmaps may include N bits each of which indicates whether each of the N sub resource blocks is the preempted resource, and each of N and M may be an integer equal to or greater than 2.

Advantageous Effects

According to the present invention, a base station may transmit information on a resource region to which resources allowed to be preempted belong, and transmit a preemption indication (PI) including a bitmap indicating a preempted resource within the resource region to a terminal. The terminal may identify the preempted resource based on the information on the resource region and the PI received from the base station, and may perform decoding operations on remaining signals excluding a signal received through the preempted resource among received entire signals. Therefore, the degradation of the decoding performance due to the preempted resource can be minimized, and the performance of the communication system can be improved.

MODES OF THE INVENTION

Figure 1:
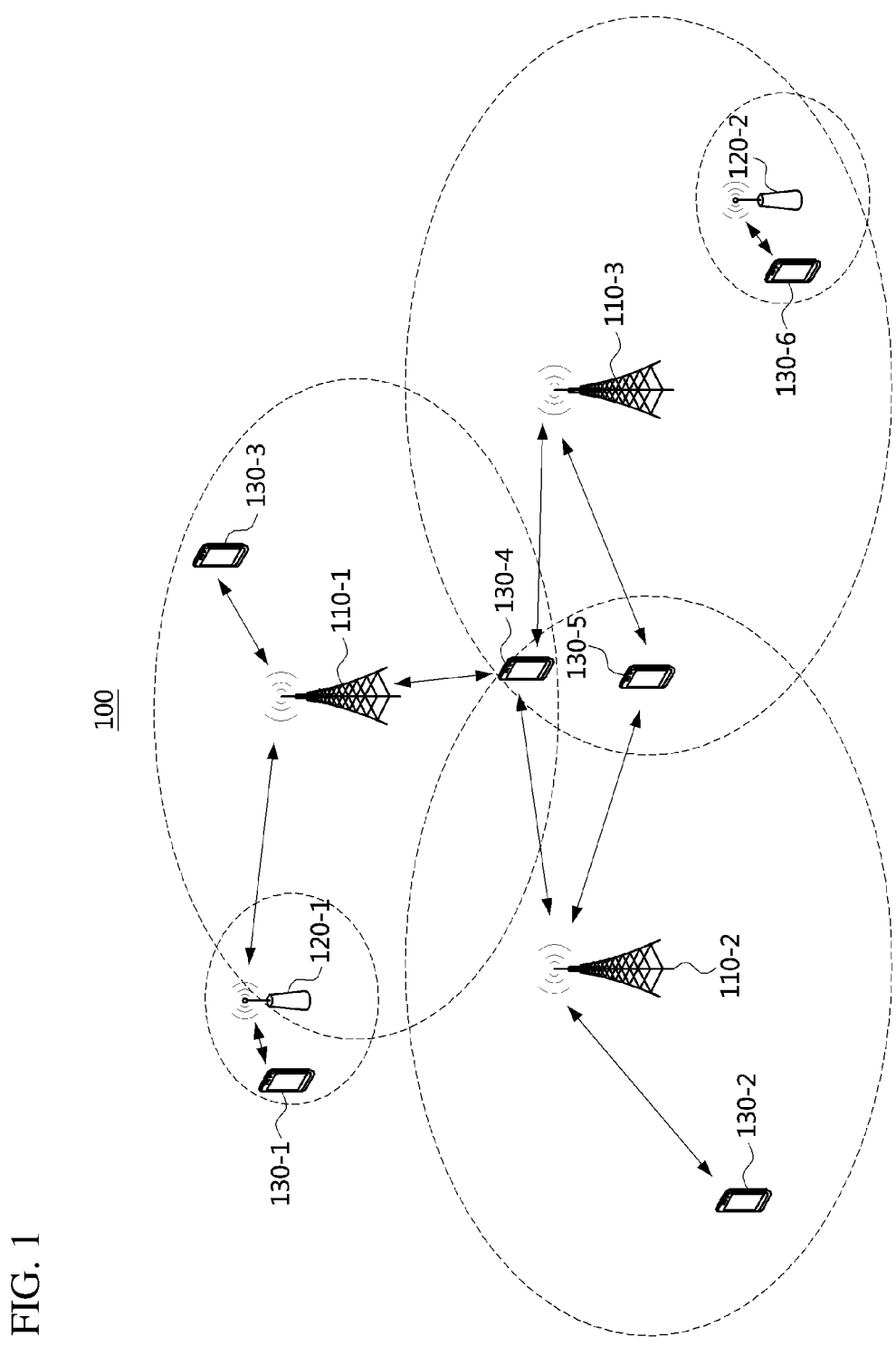
FIG. 1 is a conceptual diagram illustrating a first embodiment of a communication system.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present invention will be described in greater detail with reference to the accompanying drawings. To facilitate overall understanding of the present invention, like numbers refer to like elements throughout the description of the drawings, and description of the same component will not be reiterated.

A communication system to which embodiments according to the present disclosure will be described. However, the communication systems to which embodiments according to the present disclosure are applied are not restricted to what will be described below. That is, the embodiments according to the present disclosure may be applied to various communication systems. Here, the term 'communication system' may be used with the same meaning as the term 'communication network'.

FIG. 1 is a conceptual diagram illustrating a first embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Also, the communication system 100 may further comprise a core network (e.g., a serving gateway (S-GW), a packet data network (PDN) gateway (P-GW), and a mobility management entity (MME)). When the communication system 100 is a 5G communication system (e.g., new radio (NR) system), the core network may include an access and mobility management function (AMF), a user plane function (UPF), a session management function (SMF), and the like.

The plurality of communication nodes 110 to 130 may support a communication protocol defined by the 3rd generation partnership project (3GPP) specifications (e.g., LTE communication protocol, LTE-A communication protocol, NR communication protocol, or the like). The plurality of communication nodes 110 to 130 may support code division multiple access (CDMA) technology, wideband CDMA (WCDMA) technology, time division multiple access (TDMA) technology, frequency division multiple access (FDMA) technology, orthogonal frequency division multiplexing (OFDM) technology, filtered OFDM technology, cyclic prefix OFDM (CP-OFDM) technology, discrete Fourier transform-spread-OFDM (DFT-s-OFDM) technology, single carrier FDMA (SC-FDMA) technology, non-orthogonal multiple access (NOMA) technology, generalized frequency division multiplexing (GFDM) technology, filter band multi-carrier (FBMC) technology, universal filtered multi-carrier (UFMC) technology, space division multiple access (SDMA) technology, or the like. Each of the plurality of communication nodes may have the following structure.

Figure 2:
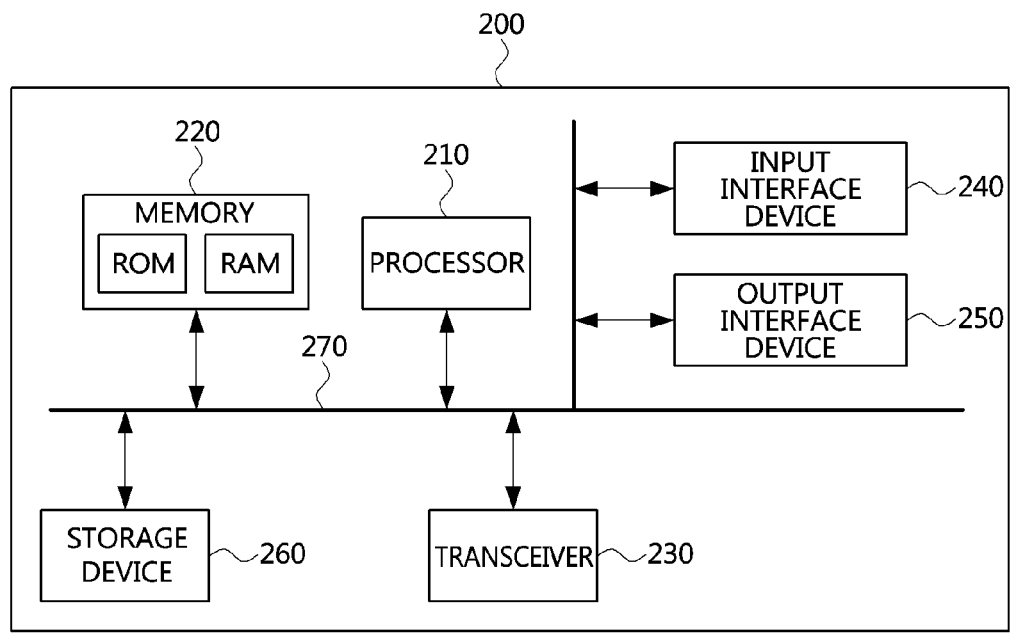
FIG. 2 is a block diagram illustrating a first embodiment of a communication node constituting a communication system.

FIG. 2 is a block diagram illustrating a first embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may not be connected to the common bus 270 but may be connected to the processor 210 via an individual interface or a separate bus. For example, the processor 210 may be connected to at least one of the memory 220, the transceiver 230, the input interface device 240, the output interface device 250 and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, or the like. Also, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, a device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Meanwhile, the communication system may support three types of frame structures. A type 1 frame structure may be applied to a frequency division duplex (FDD) communication system, a type 2 frame structure may be applied to a time division duplex (TDD) communication system, and a type 3 frame structure may be applied to an unlicensed band based communication system (e.g., a licensed assisted access (LAA) communication system).

Figure 3:
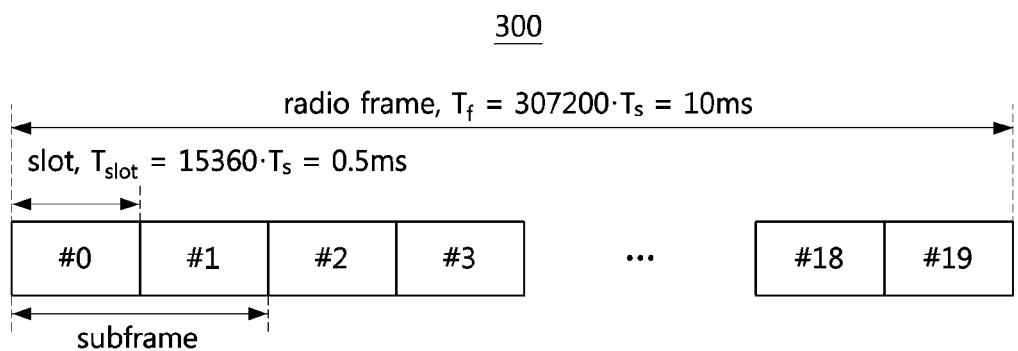
FIG. 3 is a conceptual diagram illustrating an embodiment of a type 1 frame.

FIG. 3 is a conceptual diagram illustrating an embodiment of a type 1 frame.

Referring to FIG. 3, a radio frame 300 may comprise 10 subframes, and a subframe may comprise 2 slots. Thus, the radio frame 300 may comprise 20 slots (e.g., slot #0, slot #1, slot #2, slot #3, . . . , slot #18, and slot #19). The length of the radio frame ($T_f$) 300 may be 10 milliseconds (ms). The length of the subframe may be 1 ms, and the length of a slot ($T_{slot}$) may be 0.5 ms. Here, $T_s$ may indicate a sampling time, and may be $1/30{,}720{,}000$ s.

The slot may be composed of a plurality of OFDM symbols in the time domain, and may be composed of a plurality of resource blocks (RBs) in the frequency domain. The RB may be composed of a plurality of subcarriers in the frequency domain. The number of OFDM symbols constituting the slot may vary depending on the configuration of a cyclic prefix (CP). The CP may be classified into a normal CP and an extended CP. If the normal CP is used, the slot may be composed of 7 OFDM symbols, in which case the subframe may be composed of 14 OFDM symbols. If the extended CP is used, the slot may be composed of 6 OFDM symbols, in which case the subframe may be composed of 12 OFDM symbols.

Figure 4:
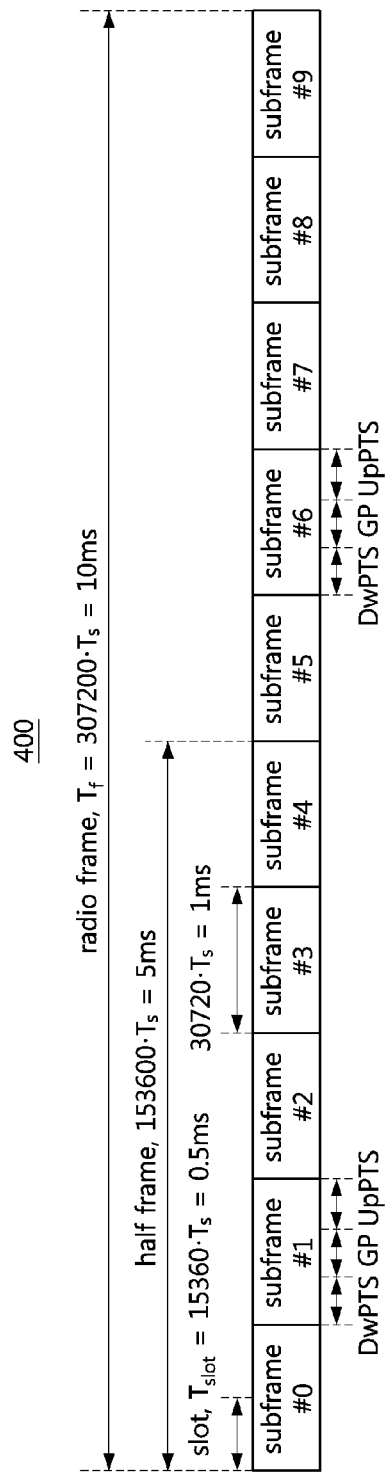
FIG. 4 is a conceptual diagram illustrating an embodiment of a type 2 frame.

FIG. 4 is a conceptual diagram illustrating an embodiment of a type 2 frame.

Referring to FIG. 4, a radio frame 400 may comprise two half frames, and a half frame may comprise 5 subframes. Thus, the radio frame 400 may comprise 10 subframes. The length ($T_f$) of the radio frame 400 may be 10 ms. The length of the half frame may be 5 ms. The length of the subframe may be 1 ms. Here, $T_s$ may be $1/30{,}720{,}000$ s.

The radio frame 400 may include at least one downlink subframe, at least one uplink subframe, and a least one special subframe. Each of the downlink subframe and the uplink subframe may include two slots. The length of a slot ($T_{slot}$) may be 0.5 ms. Among the subframes included in the radio frame 400, each of the subframe #1 and the subframe #6 may be a special subframe. For example, when a switching periodicity between downlink and uplink is 5 ms, the radio frame 400 may include 2 special subframes. Alternatively, the switching periodicity between downlink and uplink is 10 ms, the radio frame 400 may include one special subframe. The special subframe may include a downlink pilot time slot (DwPTS), a guard period (GP), and an uplink pilot time slot (UpPTS).

The downlink pilot time slot may be regarded as a downlink interval and may be used for cell search, time and frequency synchronization acquisition of the terminal, channel estimation, and the like. The guard period may be used for resolving interference problems of uplink data transmission caused by delay of downlink data reception. Also, the guard period may include a time required for switching from the downlink data reception operation to the uplink data transmission operation. The uplink pilot time slot may be used for uplink channel estimation, time and frequency synchronization acquisition, and the like. The lengths of the downlink pilot time slot, the guard period, and the uplink pilot time slot included in the special subframe may be variably adjusted as needed. In addition, the number and position of each of the downlink subframe, the uplink subframe, and the special subframe included in the radio frame 400 may be changed as needed.

Figure 5:
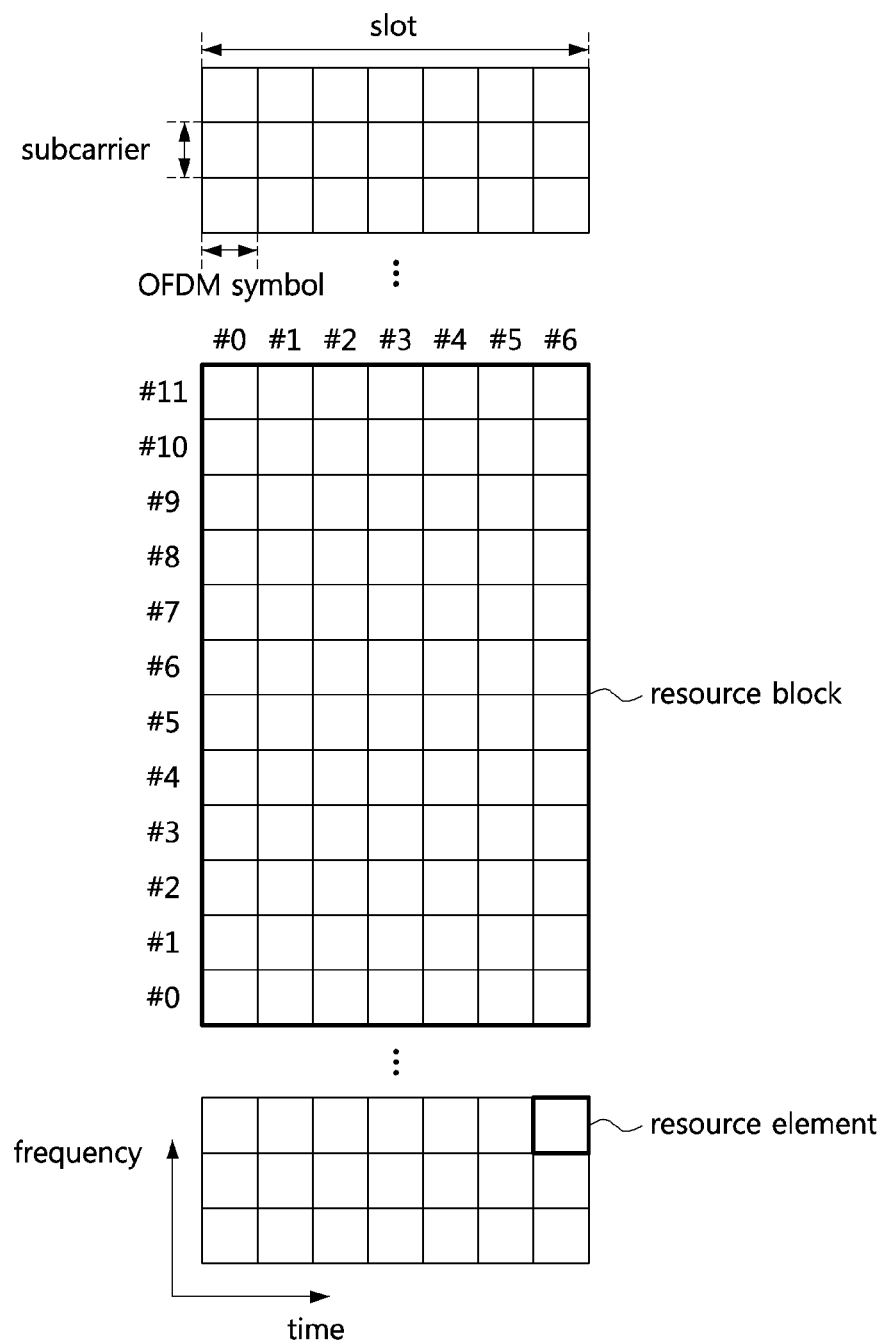
FIG. 5 is a conceptual diagram illustrating a first embodiment of a resource grid of a slot included in a subframe.

FIG. 5 is a conceptual diagram illustrating a first embodiment of a resource grid of a slot included in a subframe.

Referring to FIG. 5, a resource block of a slot included in a downlink subframe or an uplink subframe may be composed of 7 OFDM symbols in the time domain when a normal CP is used, and 12 subcarriers in the frequency domain. Each of the 7 OFDM symbols may be referred to as symbol #0, symbol #1, symbol #2, symbol #3, symbol #4, symbol #5, symbol #6, and symbol #7. Each of the 12 subcarriers may be referred to subcarrier #0, subcarrier #1, subcarrier #2, subcarrier #3, subcarrier #4, subcarrier #5, subcarrier #6, subcarrier #7, subcarrier #8, subcarrier #9, subcarrier #10, and subcarrier #11. In this case, a resource constituted by one OFDM symbol in the time domain and one subcarrier in the frequency domain may be referred to as a 'resource element (RE)'.

Next, methods for indicating and identifying a system frame number (SFN) in a communication system will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a terminal is described, a corresponding base station may perform an operation corresponding to the operation of the terminal. Conversely, when an operation of the base station is described, the corresponding terminal may perform an operation corresponding to the operation of the base station.

In the communication system, a transmission time interval (TTI) may be a basic unit of time for transmitting coded data through a physical layer. A short TTI may be used to support low latency requirements in the communication system. The length of the short TTI may be less than 1 ms. The conventional TTI having a length of 1 ms may be referred to as a base TTI or a regular TTI. That is, the base TTI may be composed of one subframe. In order to support transmission on a base TTI basis, signals and channels may be configured on a subframe basis. For example, a cell-specific reference signal (CRS), a physical downlink control channel (PDCCH), a physical downlink shared channel (PDSCH), a physical uplink control channel (PUCCH), a physical uplink shared channel (PUSCH), and the like may exist in each subframe.

On the other hand, a synchronization signal (e.g., a primary synchronization signal (PSS) and a secondary synchronization signal (SSS)) may exist for every 5 subframes, and a physical broadcast channel (PBCH) may exist for every 10 subframes. Also, each radio frame may be identified by an SFN, and the SFN may be used for defining transmission of a signal (e.g., a paging signal, a reference signal for channel estimation, a signal for channel state information, etc.) longer than one radio frame. The periodicity of the SFN may be 1024.

In the LTE system, the PBCH may be a physical layer channel used for transmission of system information (e.g., master information block (MIB)). The PBCH may be transmitted every 10 subframes. That is, the transmission periodicity of the PBCH may be 10 ms, and the PBCH may be transmitted once in the radio frame. The same MIB may be transmitted during 4 consecutive radio frames, and after 4 consecutive radio frames, the MIB may be changed according to a situation of the LTE system. The transmission period of the same MIB may be referred to as a 'PBCH TTI', and the PBCH TTI may be 40 ms. That is, the MIB may be changed for each PBCH TTI.

The MIB may be composed of 40 bits. Among the 40 bits constituting the MIB, 3 bits may be used to indicate a system band, 3 bits may be used to indicate physical hybrid automatic repeat request (ARQ) indicator channel (PHICH) related information, 8 bits may be used to indicate an SFN, 10 bits may be configured as reserved bits, and 16 bits may be used for a cyclic redundancy check (CRC).

The SFN for identifying the radio frame may be composed of a total of 10 bits (B9 to B0), and the most significant bits (MSBs) 8 bits (B9 to B2) among the 10 bits may be indicated by the PBCH (i.e., MIB). The MSBs 8 bits (B9 to B2) of the SFN indicated by the PBCH (i.e., MIB) may be identical during 4 consecutive radio frames (i.e., PBCH TTI). The least significant bits (LSBs) 2 bits (B1 to B0) of the SFN may be changed during 4 consecutive radio frames (i.e., PBCH TTI), and may not be explicitly indicated by the PBCH (i.e., MIB). The LSBs (2 bits (B1 to B0)) of the SFN may be implicitly indicated by a scrambling sequence of the PBCH (hereinafter referred to as 'PBCH scrambling sequence').

A Gold sequence generated by being initialized by a cell ID may be used as the PBCH scrambling sequence, and the PBCH scrambling sequence may be initialized for each four consecutive radio frames (e.g., each PBCH TTI) based on an operation of 'mod (SFN, 4)'. The PBCH transmitted in a radio frame corresponding to an SFN with LSBs 2 bits (B1 to B0) set to '00' may be scrambled by the Gold sequence generated by being initialized by the cell ID. Thereafter, the Gold sequences generated according to the operation of 'mod (SFN, 4)' may be used to scramble the PBCH transmitted in the radio frames corresponding to SFNs with LSBs 2 bits (B1 to B0) set to '01', '10', and '11'.

Accordingly, the terminal having acquired the cell ID in the initial cell search process may identify the value of the LSBs 2 bits (B1 to B0) of the SFN (e.g., '00', '01', '10', or '11') based on the PBCH scramble sequence obtained in the decoding process for the PBCH (i.e., MIB). The terminal may use the LSBs 2 bits (B1 to B0) of the SFN obtained based on the PBCH scrambling sequence and the MSBs 8 bits (B9 to B2) of the SFN indicated by the PBCH (i.e., MIB) so as to identify the SFN (i.e., the entire bits B9 to B0 of the SFN).

On the other hand, the communication system may support not only a high transmission rate but also technical requirements for various service scenarios. For example, the communication system may support an enhanced mobile broadband (eMBB) service, an ultra reliable low latency communication (URLLC) service, a massive machine type communication (mMTC) service, and the like.

The subcarrier spacing of the communication system (e.g., OFDM-based communication system) may be determined based on a carrier frequency offset (CFO) and the like. The CFO may be generated by a Doppler effect, a phase drift, or the like, and may increase in proportion to an operation frequency. Therefore, in order to prevent the performance degradation of the communication system due to the CFO, the subcarrier spacing may increase in proportion to the operation frequency. On the other hand, as the subcarrier spacing increases, a CP overhead may increase. Therefore, the subcarrier spacing may be configured based on a channel characteristic, a radio frequency (RF) characteristic, etc. according to a frequency band.

The communication system may support numerologies defined in Table 1 below.

TABLE 1

| $\mu$ | Subcarrier spacing ($\Delta f = 2^\mu \cdot 15$ kHz) | cyclic prefix (CP) type |
|---|---|---|
| 0 | 15 kHz | Normal |
| 1 | 30 kHz | Normal |
| 2 | 60 kHz | Normal, extended |
| 3 | 120 kHz | Normal |
| 4 | 240 kHz | Normal |
| 5 | 480 kHz | Normal |

For example, the subcarrier spacing of the communication system may be set to 15 kHz, 30 kHz, 60 kHz, or 120 kHz. The subcarrier spacing of the LTE system may be 15 kHz, and the subcarrier spacing of the NR system may be 1, 2, 4, or 8 times the conventional subcarrier spacing of 15 kHz. If the subcarrier spacing increases by exponentiation units of 2 of the conventional subcarrier spacing, the frame structure can be easily designed.

The communication system may support a wide frequency band (e.g., several hundred MHz to tens of GHz). Since the diffraction characteristic and the reflection characteristic of the radio wave are poor in a high frequency band, a propagation loss (e.g., path loss, reflection loss, and the like) in a high frequency band may be larger than a propagation loss in a low frequency band. Therefore, a cell coverage of a communication system supporting a high frequency band may be smaller than a cell coverage of a communication system supporting a low frequency band. In order to solve such the problem, a beamforming scheme based on a plurality of antenna elements may be used to increase the cell coverage in the communication system supporting a high frequency band.

The beamforming scheme may include a digital beamforming scheme, an analog beamforming scheme, a hybrid beamforming scheme, and the like. In the communication system using the digital beamforming scheme, a beamforming gain may be obtained using a plurality of RF paths based on a digital precoder or a codebook. In the communication system using the analog beamforming scheme, a beamforming gain may be obtained using analog RF devices (e.g., phase shifter, power amplifier (PA), variable gain amplifier (VGA), and the like) and an antenna array.

Because of the need for expensive digital to analog converters (DACs) or analog to digital converters (ADCs) for digital beamforming schemes and transceiver units corresponding to the number of antenna elements, the complexity of antenna implementation may be increased to increase the beamforming gain. In case of the communication system using the analog beamforming scheme, since a plurality of antenna elements are connected to one transceiver unit through phase shifters, the complexity of the antenna implementation may not increase greatly even if the beamforming gain is increased. However, the beamforming performance of the communication system using the analog beamforming scheme may be lower than the beamforming performance of the communication system using the digital beamforming scheme. Further, in the communication system using the analog beamforming scheme, since the phase shifter is adjusted in the time domain, frequency resources may not be efficiently used. Therefore, a hybrid beamforming scheme, which is a combination of the digital scheme and the analog scheme, may be used.

When the cell coverage is increased by the use of the beamforming scheme, common control channels and common signals (e.g., reference signal and synchronization signal) for all terminals belonging to the cell coverage as well as control channels and data channels for each terminal may also be transmitted based on the beamforming scheme. In this case, the common control channels and the common signals for all terminals belonging to the cell coverage may be transmitted based on a beam sweeping scheme.

Also, in the NR system, a synchronization block (SS) block may also be transmitted in a beam sweeping scheme. The SS block may be composed of a PSS, an SSS, a PBCH, and the like. In the SS block, the PSS, the SSS, and the PBCH may be configured in a time division multiplexing (TDM) manner. The SS block may be referred to as an 'SS/PBCH block'. One SS block may be transmitted using N consecutive OFDM symbols. Here, N may be an integer equal to or greater than 4. The base station may periodically transmit the SS block, and the terminal may acquire frequency/time synchronization, a cell ID, system information, and the like based on the SS block received from the base station. The SS block may be transmitted as follows.

Figure 6:
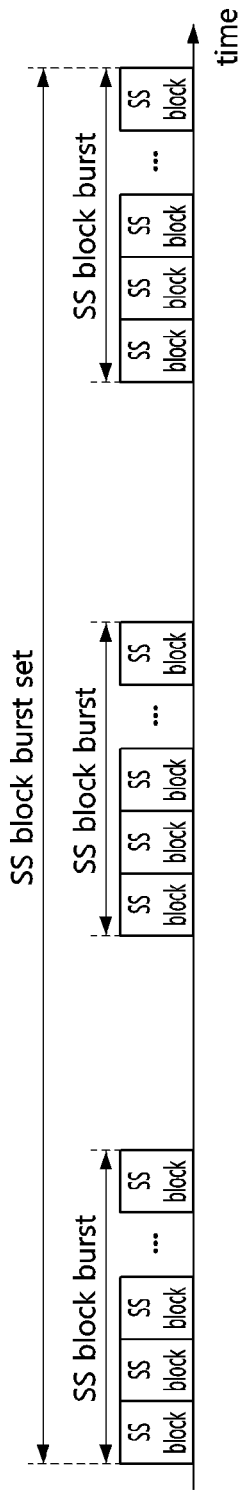
FIG. 6 is a conceptual diagram illustrating a first embodiment of a transmission method of an SS block in a communication system.

FIG. 6 is a conceptual diagram illustrating a first embodiment of a transmission method of an SS block in a communication system.

Referring to FIG. 6, one or more SS blocks in an SS block burst set may be transmitted in a beam sweeping scheme. Up to L SS blocks may be transmitted within one SS block burst set. L may be an integer equal to or greater than 2, and may be defined in the 3GPP standard. Depending on a region of a system frequency, L may vary. Within the SS block burst set, the SS blocks may be located consecutively or distributedly. The consecutive SS blocks may be referred to as an 'SS block burst'. The SS block burst set may be repeated periodically, and system information (e.g., MIB) transmitted through the PBCHs of the SS blocks within the SS block burst set may be the same. An index of the SS block, an index of the SS block burst, an index of an OFDM symbol, an index of a slot, and the like may be indicated explicitly or implicitly by the PBCH.

The maximum system bandwidth supported by the NR system may be 400 MHz. The maximum size of bandwidth supported by the terminal may differ depending on the capability of the terminal. Accordingly, the terminal may perform an initial access procedure (e.g., an initial connection procedure) using a part of the system bandwidth of the NR system supporting a wideband. In order to support the access procedure of terminal supporting various sizes of bandwidths, the SS blocks may be multiplexed in the frequency axis within the system bandwidth of the NR system supporting the wide band. In this case, the SS blocks may be transmitted as follows.

Figure 7:
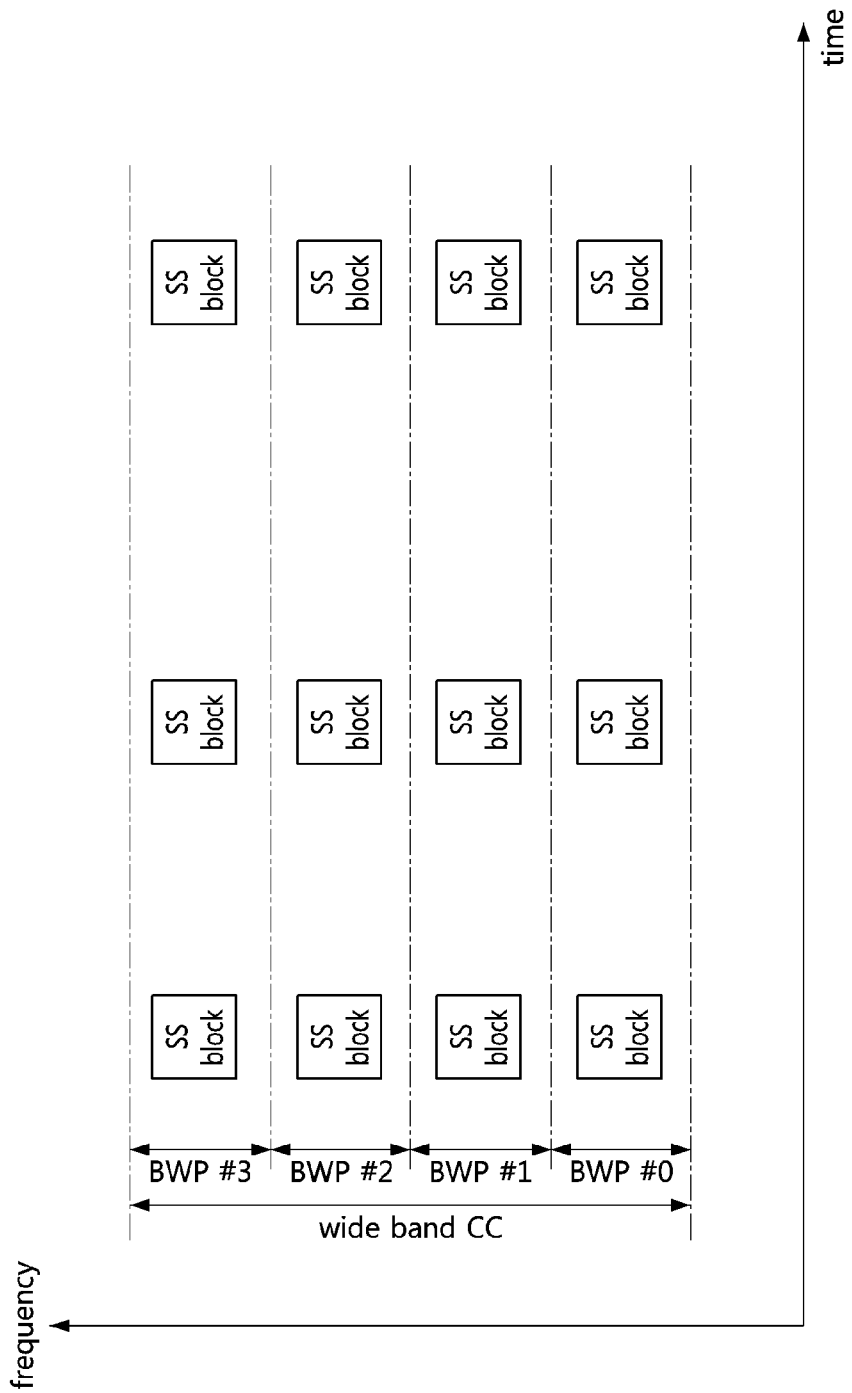
FIG. 7 is a conceptual diagram illustrating a second embodiment of a transmission method of an SS block in a communication system.

FIG. 7 is a conceptual diagram illustrating a second embodiment of a transmission method of an SS block in a communication system.

Referring to FIG. 7, a wideband component carrier (CC) may include a plurality of bandwidth parts (BWPs). For example, a wideband CC may include 4 BWPs. The base station may transmit SS blocks (e.g., SS/PBCH blocks) in each of the BWPs #0 to #3 belonging to the wideband CC.

The terminal may receive the SS blocks in one or more BWPs of the BWPs #0 to #3, and may perform the initial access procedure using the received SS blocks. Here, the terminal supporting a wideband may receive a plurality of SS blocks by monitoring the entire system bandwidth. On the other hand, the terminal supporting a narrowband (e.g., a band narrower than the wideband) may receive the SS blocks by monitoring one or more BWPs. The BWP monitored by the terminal may be an activated BWP.

Also, since the terminal performing the initial access procedure does not know information on the system bandwidth, the terminal may perform the initial access procedure by using one SS block among the SS blocks received from one or more BWPs, irrespective of the bandwidth that the terminal is capable of supporting. Here, the BWP through which the SS block is transmitted may be some BWPs among the BWPs #0 to #3 belonging to the wideband CC.

Meanwhile, the NR system may simultaneously support various services (eMBB service, URLLC service, mMTC service, etc.). For example, the NR system may simultaneously support the eMBB service requiring a high data rate and the URLLC service requiring a high reliability and a low latency. When the NR system supports the wideband, and an occurrence frequency of the eMBB service and an occurrence frequency of the URLLC service are all high, the system bandwidth of the NR system may be divided into a first frequency band used for the eMBB service and a second frequency band used for the URLLC service, and each of the first and second frequency bands may comprise one or more BWPs.

For example, data generated according to the eMBB service (hereinafter referred to as 'eMBB data') may be transmitted and received using the first frequency band, and data generated according to the URLLC service (hereinafter referred to as 'URLLC data') may be transmitted and received using the second frequency band. In the following embodiments, the eMBB data may indicate normal data for which urgent transmission is not required, and the URLLC data may indicate urgent data for which urgent transmission is required. The eMBB data may be multiplexed with the URLLC data in the frequency axis. Time-frequency resources (e.g., the first frequency band) used for transmission and reception of the eMBB data may be referred to as 'eMBB resources'; and time-frequency resources (e.g., the second frequency band) used for transmission and reception of the URLLC data may be referred to as 'URLLC resources'.

According to the characteristics of the URLLC service, the URLLC data should be transmitted within a short period of time from the time point of occurrence of the URLLC data. Therefore, a wide frequency band may be required for transmission of the URLLC data. Since the occurrence frequency of the URLLC data is lower than the occurrence frequency of the eMBB data, the efficiency of resource use may be lowered when the URLLC resources (e.g., frequency band) for the URLLC data are separately allocated. Therefore, in the NR system, the system bandwidth may be allocated for the eMBB service, and when the URLLC data according to the URLLC service is generated, the resources allocated for the eMBB service may be used for transmission of the URLLC data.

Since the URLLC data should be transmitted within a short period of time from the generation of the URLLC data, a scheduling operation for the eMBB data may not be performed considering the transmission of the URLLC data. For example, if it is necessary to transmit the URLLC data while the eMBB data is being transmitted, some time-frequency resources among the eMBB resources allocated for transmission of the eMBB data may be punctured, and the URLLC data may be transmitted using the punctured time-frequency resources. That is, some time-frequency resources among the eMBB resources may be preempted for the transmission of the URLLC data.

In this case, the terminal receiving the eMBB data (hereinafter referred to as 'eMBB terminal') may not know that some time-frequency resources among the eMBB resources have been preempted for the transmission of the URLLC data. In this reason, the eMBB terminal may determine that the URLLC data received through the some time-frequency resources (e.g., the punctured time-frequency resources) is the eMBB data, and may also decode both the eMBB data and the URLCC data. Since the eMBB data is different from the URLLC data, the eMBB terminal may determine that an error rate of the decoded eMBB data is high. That is, a cyclic redundancy check (CRC) result of the eMBB data may be a negative acknowledgment (NACK).

In order to prevent degradation of the decoding performance, the base station may transmit a preemption indication (PI) indicating that some time-frequency resources among the eMBB resources have been preempted for the transmission of the URLLC data. The eMBB terminal receiving the PI may determine that the some time-frequency resources have been preempted for the transmission of the URLLC data. Accordingly, the eMBB terminal may perform a nulling operation on data (e.g., URLLC data) obtained from the preempted time-frequency resources. That is, the eMBB terminal may perform a decoding operation (hereinafter, referred to as 'preemption decoding operation') on the remaining data excluding the data obtained from the preempted time-frequency resources among the entire data received through the eMBB resources. The performance of the preemption decoding operation may be degraded as compared with the performance of the decoding operation in the case where only the eMBB data is received through the entire eMBB resources. However, the performance of the preemption decoding operation may be better than the performance of the decoding operation in the case where the terminal does not know that the URLLC data has been transmitted through the some time-frequency resource among the eMBB resources.

Therefore, a method of informing the eMBB terminal of the preempted time-frequency resources for the transmission of the URLLC data among the eMBB resources may be required. In the following embodiments, preempted time-frequency resource signaling methods will be described in detail.

Among the eMBB resources, a resource region (e.g., a frequency resource) to which the preempted time-frequency resources for transmission of the URLLC data belong may be referred to as 'reference downlink resource (RDR)'. The RDR may include one or more physical resource blocks (PRBs) or one or more BWPs. For example, the RDR may indicate one or more BWPs among the BWPs #0 to #3 shown in FIG. 7. Alternatively, the RDR may be a subband of the NR system. The base station may use at least one of system information (e.g., SS/PBCH block) and radio resource control (RRC) signaling (e.g., UE-specific RRC signaling) to transmit information indicating the RDR.

Since a low code rate and a low modulation order are used for transmission of the URLLC data, a wide frequency band may be required for transmission of the URLLC data. Thus, the preempted time-frequency resources (e.g., URLLC resources) for transmission of the URLLC data may be composed of a short time period and a wide frequency region. Therefore, a preemption resource (PR) indicating URLLC resources consisting of a short time period and a wide frequency region in the RDR may be required.

Here, the PI may indicate presence or absence of the preempted time-frequency resources for transmission of the URLLC data, and the PR may indicate the preempted time-frequency resources (e.g., URLLC resources) for transmission of the URLLC data. Also, the PR may indicate a pattern of URLLC resources, and the PR may be configured separately from the PI. The PI may further include information indicating the number of slots to which the PR is applied. When the PR is configured separately from the PI, the PR may be transmitted from the base station to the eMBB terminal through system information (e.g., SS/PBCH block), RRC message, or downlink control information (DCI).

For example, the base station may transmit information indicating the RDR through system information, and may transmit the PR indicating URLLC resources (e.g., a pattern of URLLC resources) within the RDR through an RRC message. That is, the eMBB terminal may receive the RDR and the PR from the base station, and may confirm the URLLC resources available for transmission of the URLLC data based on the RDR and the PR.

Also, the base station may transmit a DCI including resource allocation information (e.g., eMBB resources) of the eMBB data to the eMBB terminal. When the resource region indicated by the RDR overlaps with the eMBB resources scheduled by the DCI, the eMBB terminal may monitor preconfigured resources (e.g., resources preconfigured for PI transmission) to detect the PI. When the PI is detected, the eMBB terminal may determine that the URLLC data has been transmitted through the time-frequency resources indicated by the PR within the RDR, and in the decoding process, the eMBB terminal may exclude the URLLC data obtained through the time-frequency resources indicated by the PR.

Alternatively, the PI may indicate not only 'whether the preempted time-frequency resources (e.g., URLLC resource) for transmission of URLLC data are present or not' but also the preempted time-frequency resources (e.g., URLLC resource) for transmission of URLLC data. In this case, a separate PR may not be configured. For example, the base station may transmit information indicating the RDR through system information. That is, the eMBB terminal may receive the information indicating the RDR from the base station, and may confirm the frequency region to which the URLLC resources available for transmission of the URLLC data belong based on the RDR.

Also, the base station may transmit a DCI including resource allocation information (e.g., eMBB resources) of eMBB data to the eMBB terminal. When the resource region indicated by the RDR overlaps with the eMBB resources scheduled by the DCI, the eMBB terminal may monitor preconfigured resources (e.g., resources preconfigured for PI transmission) to detect the PI. When the PI is detected, the eMBB terminal may determine that the URLLC data has been transmitted through the time-frequency resources indicated by the PI within the RDR, and in the decoding process, the eMBB terminal may exclude the URLLC data obtained through the time-frequency resources indicated by the PI. The URLLC resources indicated by the PR or PI may be changed dynamically within the RDR.

The URLLC resources may be indicated by a bitmap as in the following embodiments. That is, the PR or PI may include a bitmap indicating URLLC resources.

Figure 8A:
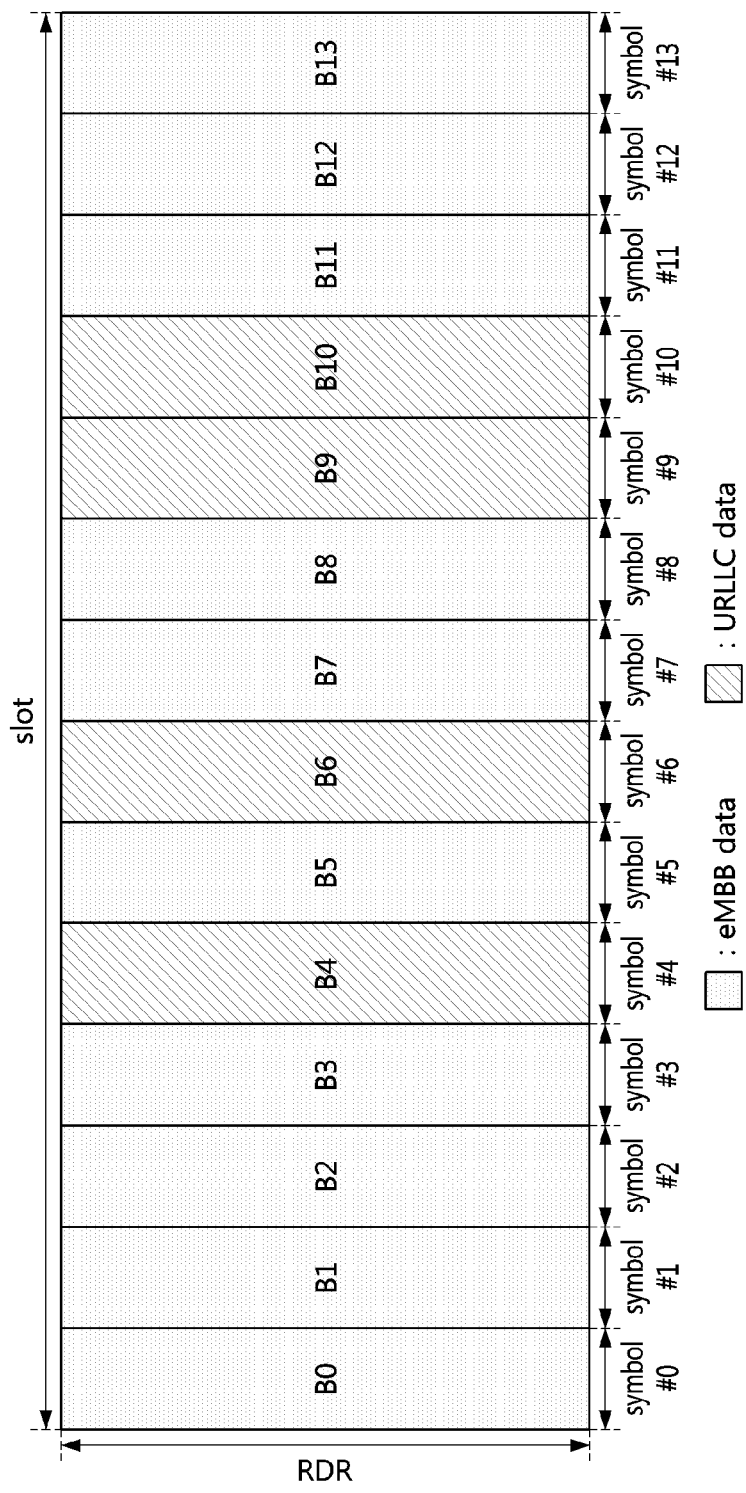
FIG. 8A is a conceptual diagram illustrating a first embodiment of a method of indicating URLLC resources when a 'mode 00' is used in a communication system.
Figure 8B:
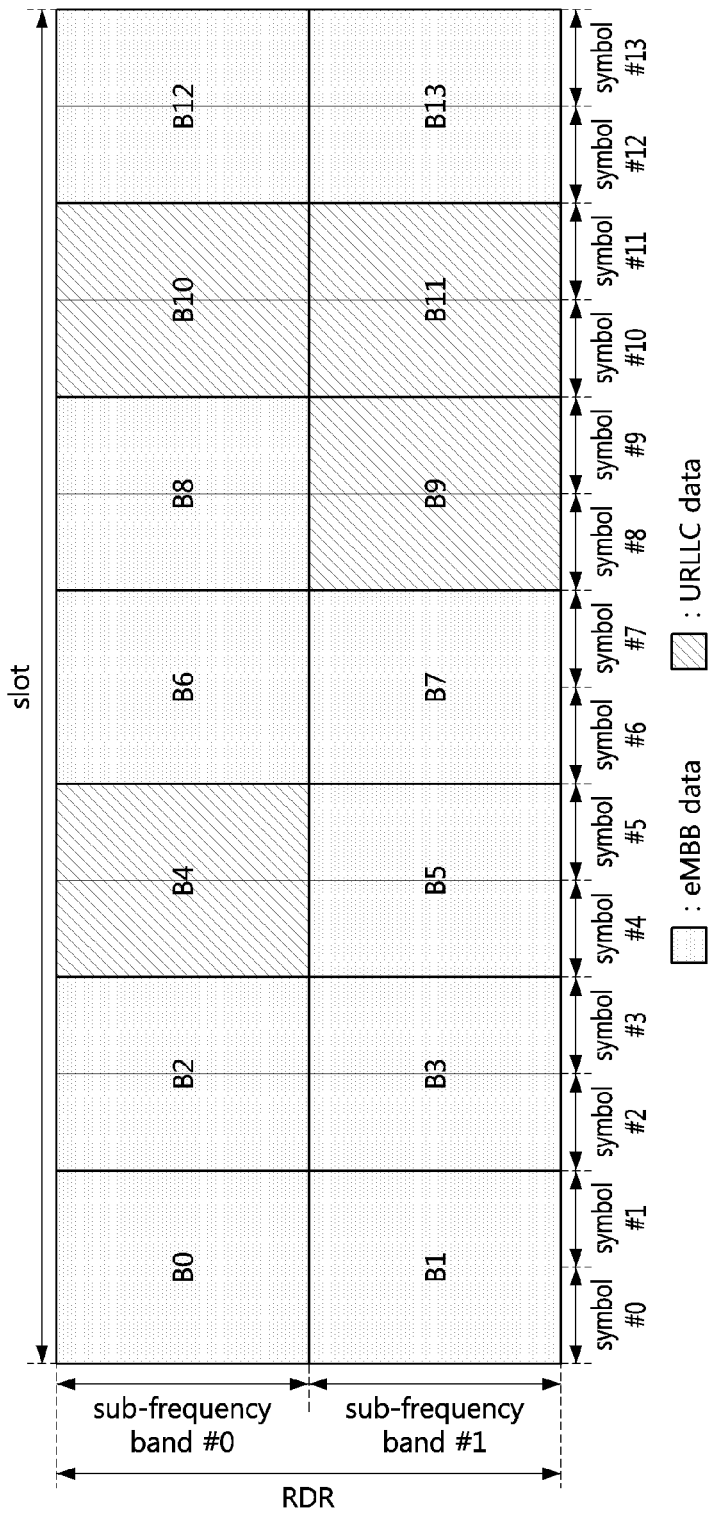
FIG. 8B is a conceptual diagram illustrating a first embodiment of a method of indicating URLLC resources when a 'mode 01' is used in a communication system.
Figure 8C:
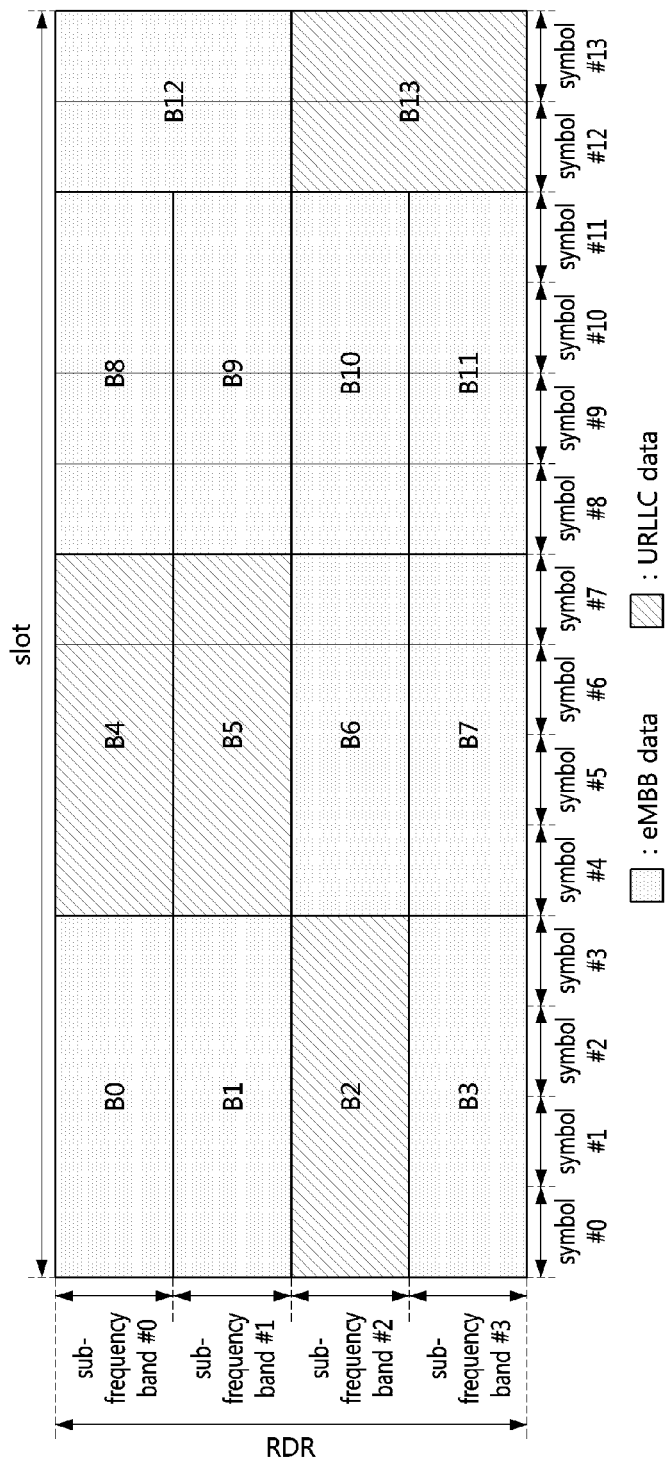
FIG. 8C is a conceptual diagram illustrating a first embodiment of a method of indicating URLLC resources when a 'mode 10' is used in a communication system.
Figure 8D:
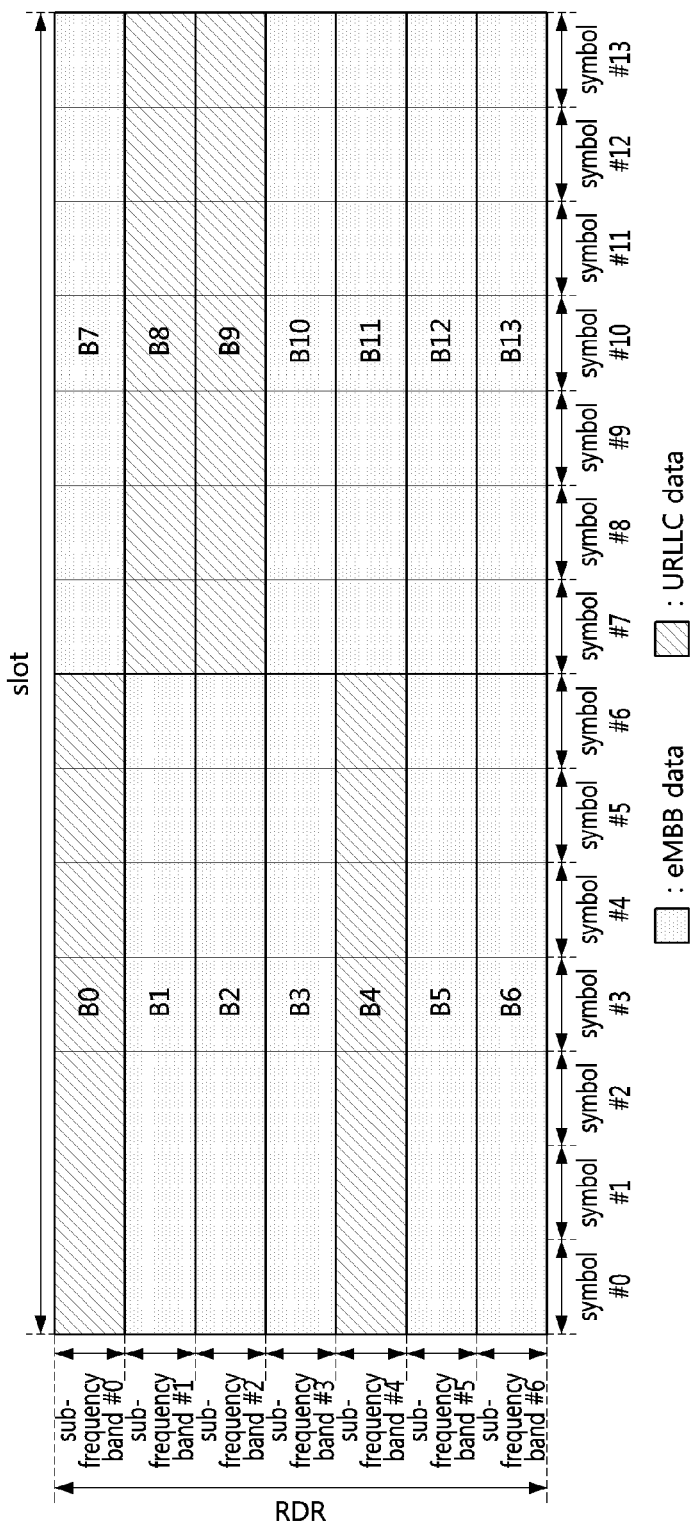
FIG. 8D is a conceptual diagram illustrating a first embodiment of a method of indicating URLLC resources when a 'mode 11' is used in a communication system.

FIG. 8A is a conceptual diagram illustrating a first embodiment of a method of indicating URLLC resources when a 'mode 00' is used in a communication system, FIG. 8B is a conceptual diagram illustrating a first embodiment of a method of indicating URLLC resources when a 'mode 01' is used in a communication system, FIG. 8C is a conceptual diagram illustrating a first embodiment of a method of indicating URLLC resources when a 'mode 10' is used in a communication system, and FIG. 8D is a conceptual diagram illustrating a first embodiment of a method of indicating URLLC resources when a 'mode 11' is used in a communication system.

Referring to FIGS. 8A to 8D, the length of one subframe may be 1 ms, and the subframe may include one or more slots according to a subcarrier spacing. For example, one subframe may include one slot when a subcarrier spacing of 15 kHz is used, one subframe may include 2 slots when a subcarrier spacing of 30 kHz is used, one subframe may include 4 slots when a subcarrier spacing of 60 kHz is used, and one subframe may include 8 slots when a subcarrier spacing of 120 kHz is used.

The slot may have a variable length depending on the subcarrier spacing, and may include 14 symbols (e.g., OFDM symbols), regardless of the subcarrier spacing. The length of the slot may be 1 ms when a subcarrier spacing of 15 kHz is used, the length of the slot may be 0.5 ms when a subcarrier spacing of 30 kHz is used, the length of the slot may be 0.25 ms when a subcarrier spacing of 60 kHz is used, and the length of the slot may be 0.125 ms when a subcarrier spacing of 120 kHz is used.

The bitmap may indicate URLLC resources on a slot basis. A configuration unit of the URLLC resources (e.g., preemption configuration unit) may be 1 symbol, 2 symbols, 4 symbols, or 7 symbols. For example, in the case where the configuration unit of the URLLC resource is 1 symbol, 1 symbol in the time axis may be configured as the URLLC resource, and in this case, one bit included in the bitmap may indicate whether 1 symbol in the time axis is used as the URLLC resource. In the case where the configuration unit of the URLLC resource is 2 symbols, 2 symbols consecutive in the time axis may be configured as the URLLC resource, and in this case, one bit included in the bit map may indicate whether 2 symbols consecutive in the time axis are used as the URLLC resource.

In the case where the configuration unit of the URLLC resource is 4 symbols, 4 symbols consecutive in the time axis may be configured as the URLLC resource, and in this case, one bit included in the bitmap may indicate whether 4 symbols consecutive in the time axis are used as the URLLC resource. However, 14 symbols included in the slot are not divided into 4 units. In this case, the configuration unit of the URLLC resource may be 4 symbols in the symbols #0 to #11 in the slot, and the configuration unit of the URLLC resource may be 2 symbols in the symbols #12 to #13 in the slot. In the case where the configuration unit of the URLLC resource is 7 symbols, 7 symbols consecutive in the time axis may be configured as the URLLC resource, and in this case, one bit included in the bitmap may indicate whether 7 symbols consecutive in the time axis are used as the URLLC resource.

In addition, the RDR may be divided into one or more sub-frequency bands according to the configuration unit of the URLLC resource. In the case where the configuration unit of the URLLC resource is 1 symbol, the RDR may be configured as one sub-frequency band, in which case one bit included in the bitmap indicates whether the one sub-frequency band is used as the URLLC resource. In the case where the configuration unit of the URLLC resource is 2 symbols, the RDR may be configured with 2 sub-frequency bands, in which case one bit included in the bitmap indicates whether one of the 2 sub-frequency bands is used as the URLLC resource.

In the case where the configuration unit of the URLLC resource is 4 symbols, the RDR may be configured with 4 sub-frequency bands, in which case one bit included in the bitmap may indicate whether one of the 4 sub-frequency bands is used as the URLLC resource. However, 14 symbols included in the slot are not divided into 4 units. In this case, the RDR may be divided into 4 sub-frequency bands in the symbols #0 to #11 in the slot, and the RDR may be divided into 2 sub-frequency bands in the symbols #12 to #13 in the slot. In the case where the configuration unit of the URLLC resource is 7 symbols, the RDR may be configured with 7 sub-frequency bands, in which case one bit included in the bitmap indicates whether one of the 7 sub-frequency bands is used as the URLLC resource.

The unit of symbols and the number of sub-frequency bands constituting the RDR may be defined as shown in Table 2 below.

TABLE 2

| Mode index | Unit of symbols configured as URLLC resource | Number of sub-frequency bands constituting RDR |
|---|---|---|
| 00 | 1 | 1 |
| 01 | 2 | 2 |
| 10 | 4 | 4 |
| 11 | 7 | 7 |

The bitmap may consist of 'mode index+preempted resource indicator'. A bit set to '0' in the preempted resource indicator may indicate a resource (e.g., eMBB resource) not used for transmission of the URLLC data, and a bit set to '1' in the preempted resource indicator may indicate a URLLC resource.

For example, in the embodiments shown in FIGS. 8A to 8D, in the preempted resource indicator, the first bit may indicate whether B0 in the RDR is preempted as the URLLC resource, the second bit may indicate whether B1 in the RDR is preempted as the URLLC resource, the third bit may indicate whether B2 in the RDR is preempted as the URLLC resource, the fourth bit may indicate whether B3 in the RDR is preempted as the URLLC resource, the fifth bit may indicate whether B4 in the RDR is preempted as the URLLC resource, the sixth bit may indicate whether B5 in the RDR is preempted as the URLLC resource, and the seventh bit may indicate whether B6 in the RDR is preempted as the URLLC resource.

Also, in the preempted resource indicator, the eighth bit may indicate whether B7 in the RDR is preempted as the URLLC resource, the ninth bit may indicate whether B8 in the RDR is preempted as the URLLC resource, the tenth bit may indicate whether B9 in the RDR is preempted as the URLLC resource, the eleventh bit may indicate whether B10 in the RDR is preempted as the URLLC resource, the twelfth bit may indicate whether B11 in the RDR is preempted as the URLLC resource, the thirteenth bit may indicate whether B12 in the RDR is preempted as the URLLC resource, and the fourteenth bit may indicate whether B13 in the RDR is preempted as the URLLC resource.

Alternatively, the bitmap may be composed of the preempted resource indicator without the mode index. In this case, the PR or PI may include the preempted resource indicator, and the mode index may be transmitted through system information or an RRC message. That is, the mode index may be signaled independently of the preempted resource indicator. In this case, the mode index may be configured semi-statically, and the preempted resource indicator may be configured dynamically.

When the mode 00 is used, the bitmap may indicate the URLLC resources on a symbol basis in the time axis, and may indicate the URLLC resources on an RDR basis in the frequency axis. In the embodiment shown in FIG. 8A, the bitmap ('mode index+preempted resource indicator') may be set to '0000001010011000'. In this case, the base station may transmit the PR or the PI including the bitmap '0000001010011000' to the eMBB terminal. The eMBB terminal receiving the PR or PI may determine that the URLLC data has been transmitted through B4, B6, B9, and B10 in the RDR. Accordingly, the eMBB terminal may exclude the URLLC data obtained through B4, B6, B9, and B10 in the RDR in the decoding procedure of the eMBB data.

When the mode 01 is used, the bitmap may indicate the URLLC resources in units of 2 symbols in the time axis, and may indicate the URLLC resource in units of ½ RDR in the frequency axis. In the embodiment shown in FIG. 8B, the mode index in the bitmap may be set to '01', and the preempted resource indicator in the bitmap may be set to '00001000011100'. In this case, the base station may transmit the PR or the PI including the bitmap '0100001000011100' to the eMBB terminal. The eMBB terminal receiving the PR or PI may determine that the URLLC data is transmitted through B4, B9, B10, and B11 in the RDR. Accordingly, the eMBB terminal may exclude the URLLC data obtained through B4, B9, B10, and B11 in the RDR in the decoding procedure of the eMBB data.

When the mode 10 is used, the bitmap may indicate the URLLC resource in units of 4 symbols in the time axis, and may indicate the URLLC resource in units of ¼ RDR in the frequency axis. In the embodiment shown in FIG. 8C, the mode index in the bitmap may be set to '10', and the preempted resource indicator in the bitmap may be set to '00101100000001'. In this case, the base station may transmit the PR or the PI including the bitmap '1000101100000001' to the eMBB terminal. The eMBB terminal receiving the PR or PI may determine that the URLLC data is transmitted through B2, B4, B5, and B13 in the RDR. Accordingly, the eMBB terminal may exclude the URLLC data obtained through B2, B4, B5, and B13 in the RDR in the decoding procedure of the eMBB data.

When the mode 11 is used, the bitmap may indicate the URLLC resource in units of 7 symbols in the time axis, and may indicate the URLLC resource in units of ½ RDR in the frequency axis. In the embodiment shown in FIG. 8D, the mode index in the bitmap may be set to '11', and the preempted resource indicator in the bitmap may be set to '10001000110000'. In this case, the base station may transmit the PR or the PI including the bitmap '1110001000110000' to the eMBB terminal. The eMBB terminal receiving the PR or PI may determine that the URLLC data is transmitted through B0, B4, B8, and B9 in the RDR. Accordingly, the eMBB terminal may exclude the URLLC data obtained through B0, B4, B8, and B9 in the RDR in the decoding procedure of the eMBB data.

Even when the mode is changed, the size of the bitmap indicating the URLLC resource remains the same, so that the bitmap indicating the URLLC resource can be efficiently signaled. The RDR, the unit of symbols, the number of sub-frequency bands constituting the RDR, and the types of the mode are not limited to the above-described embodiments and may be variously configured. For example, the size of the mode index may be set to 1 bit or 3 bits. If the size of the mode index is 3 bits, 8 modes may be indicated.

Meanwhile, a front resource region of a slot may be used for transmission and reception of control channels. For example, the front resource region of the slot may be configured with a control resource set (CORESET). Therefore, a URLLC resource may be configured in a resource region excluding the resource region (e.g., CORESET) used for transmission and reception of the control channels in the RDR. In this case, the URLLC resource may be configured as follows.

Figure 9A:
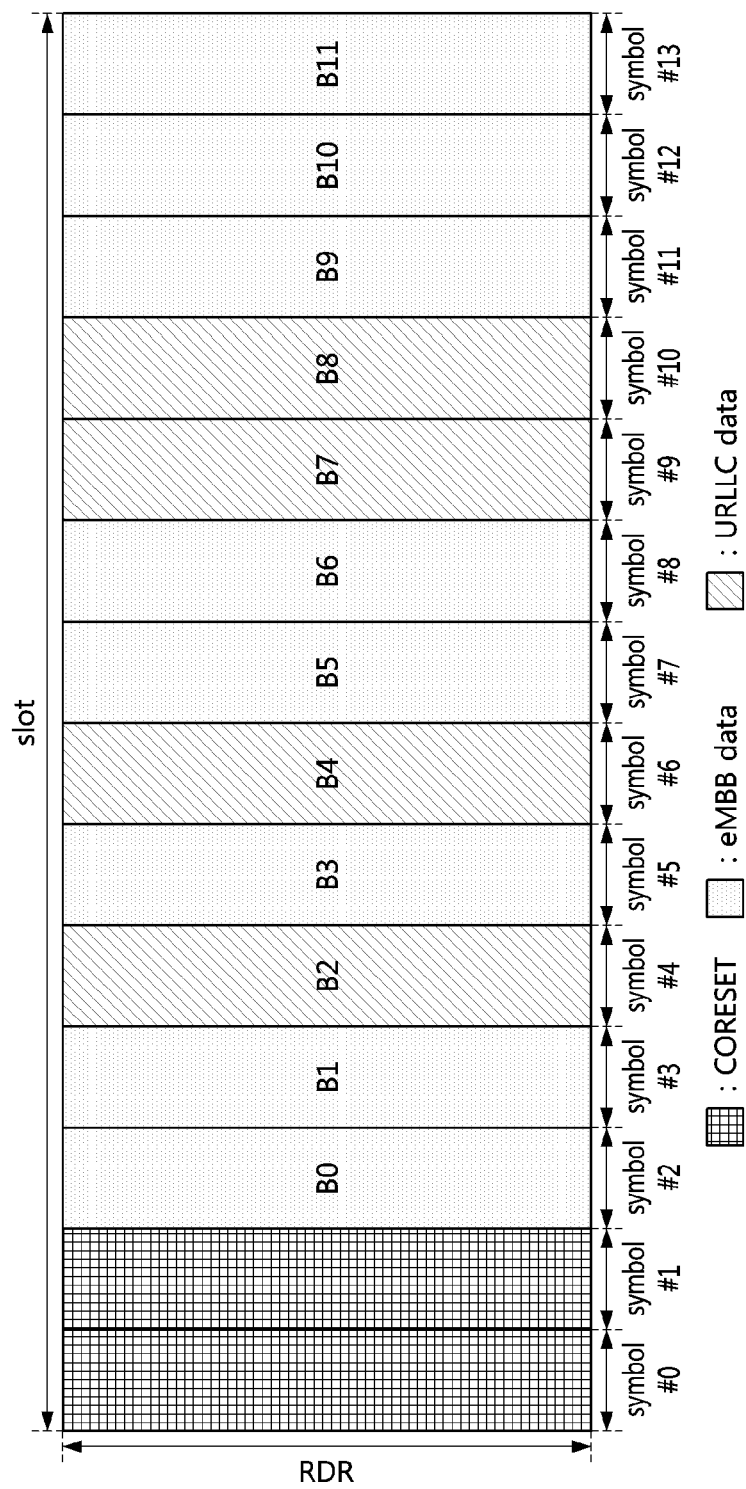
FIG. 9A is a conceptual diagram illustrating a second embodiment of a method of indicating URLLC resources when a 'mode 00' is used in a communication system.
Figure 9B:
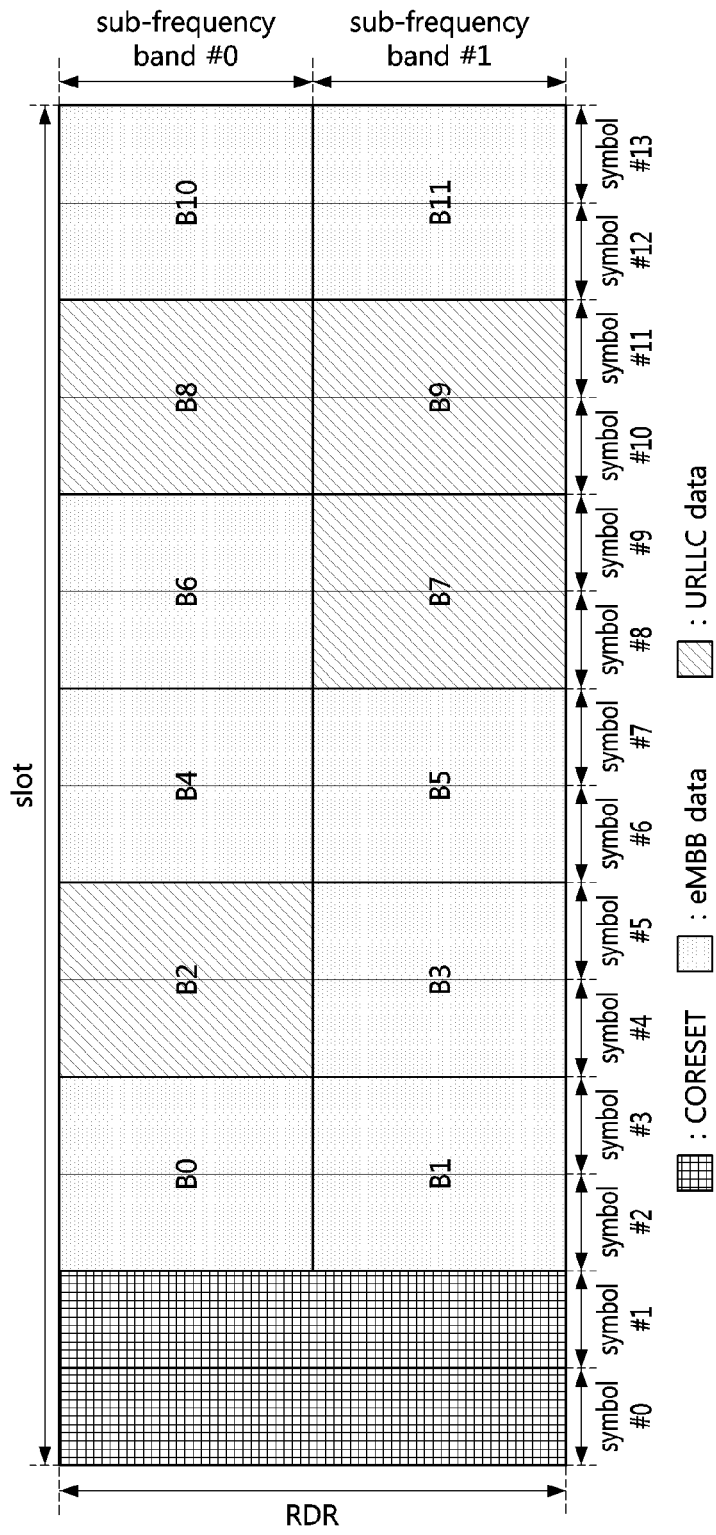
FIG. 9B is a conceptual diagram illustrating a second embodiment of a method of indicating URLLC resources when a 'mode 01' is used in a communication system.
Figure 9C:
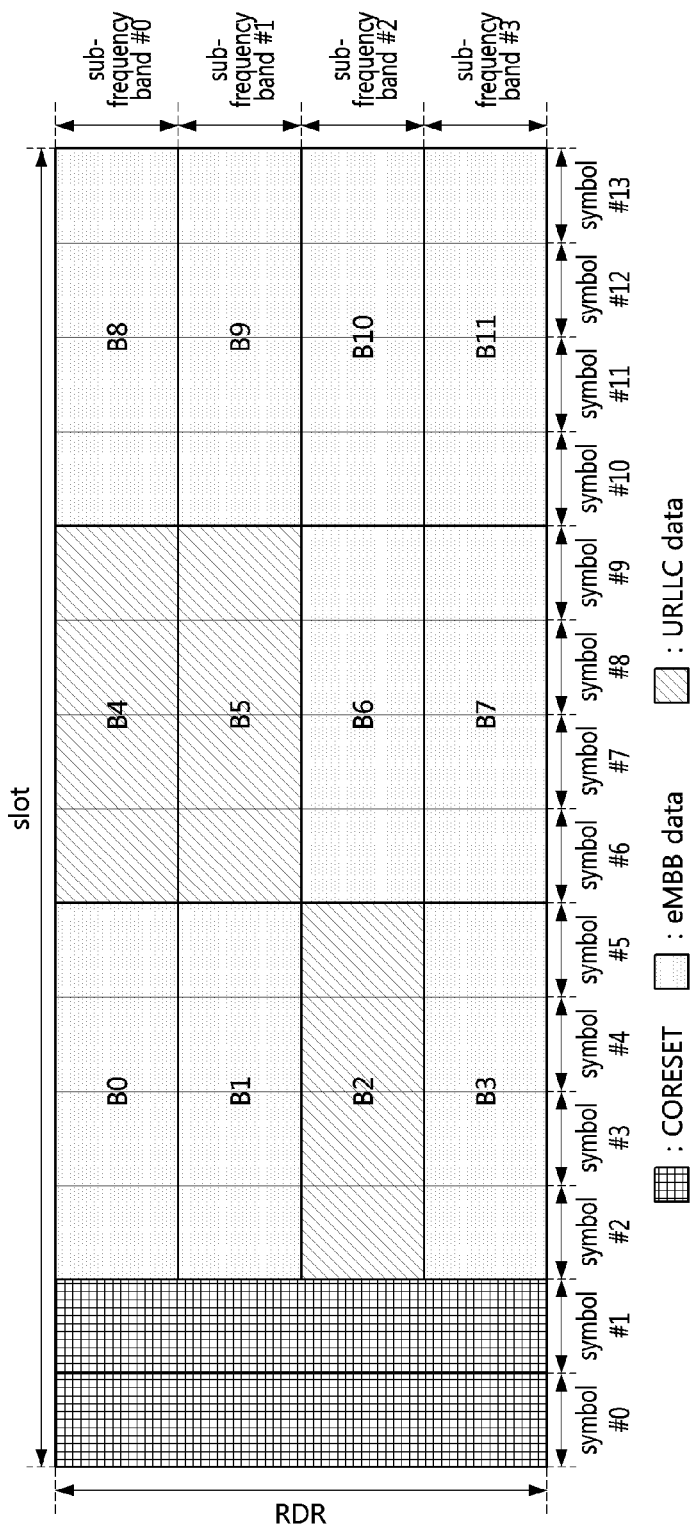
FIG. 9C is a conceptual diagram illustrating a second embodiment of a method of indicating URLLC resources when a 'mode 10' is used in a communication system.
Figure 9D:
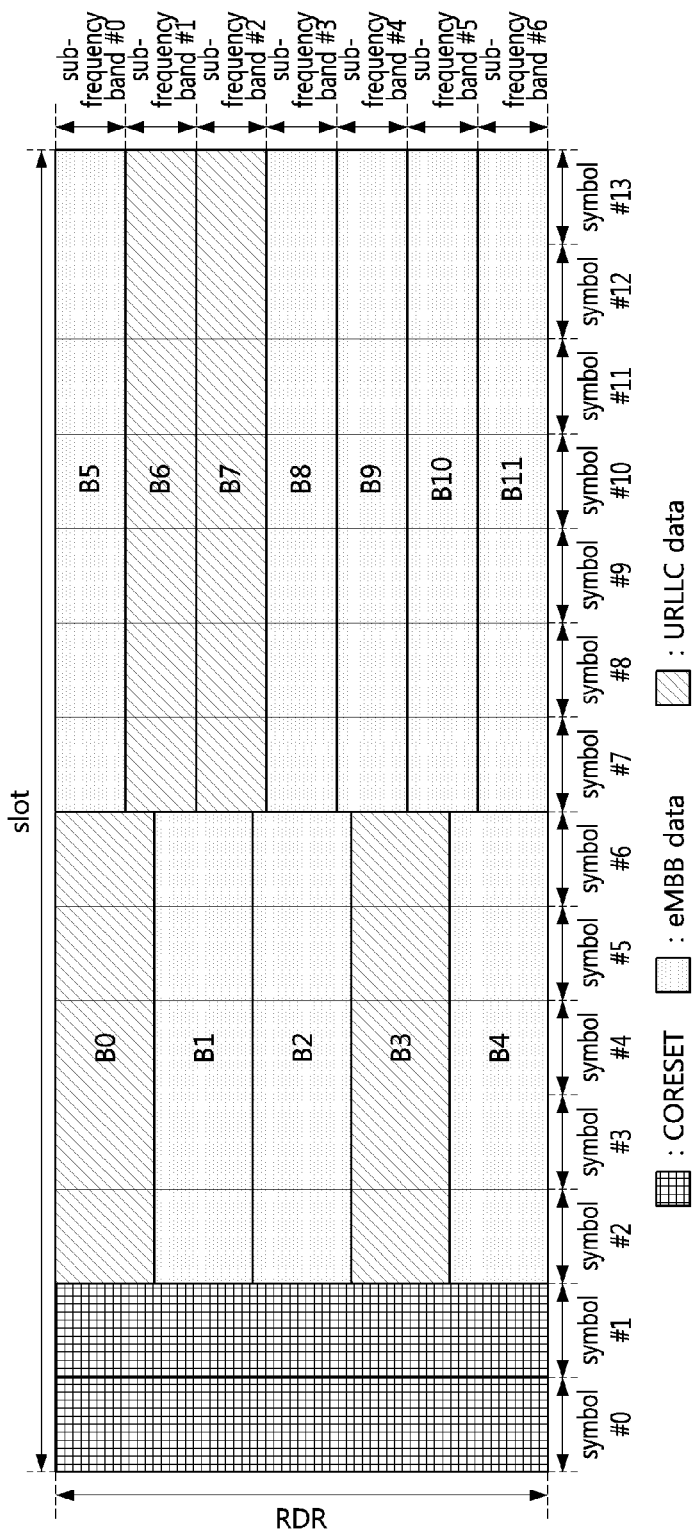
FIG. 9D is a conceptual diagram illustrating a second embodiment of a method of indicating URLLC resources when a 'mode 11' is used in a communication system.

FIG. 9A is a conceptual diagram illustrating a second embodiment of a method of indicating URLLC resources when a 'mode 00' is used in a communication system, FIG. 9B is a conceptual diagram illustrating a second embodiment of a method of indicating URLLC resources when a 'mode 01' is used in a communication system, FIG. 9C is a conceptual diagram illustrating a second embodiment of a method of indicating URLLC resources when a 'mode 10' is used in a communication system, and FIG. 9D is a conceptual diagram illustrating a second embodiment of a method of indicating URLLC resources when a 'mode 11' is used in a communication system.

Referring to FIGS. 9A to 9D, a slot may include 14 symbols, and the symbols #0 to #1 in the slot may be configured with a CORESET. In this case, the URLLC resource may be configured in the symbols #2 to #13 in the slot. In the embodiment shown in FIG. 9A, the mode index in the bitmap may be set to '00' and the preempted resource indicator in the bitmap may be set to '001010011000'. In this case, the base station may transmit the PR or the PI including the bitmap '00001010011000' to the eMBB terminal. The eMBB terminal receiving the PR or PI may determine that the URLLC data is transmitted through B2, B4, B7, and B8 in the RDR. Accordingly, the eMBB terminal may exclude the URLLC data obtained through B2, B4, B7, and B8 in the RDR in the decoding procedure of the eMBB data.

In the embodiment shown in FIG. 9B, the mode index in the bitmap may be set to '01' and the preempted resource indicator in the bitmap may be set to '001000011100'. In this case, the base station may transmit the PR or the PI including the bitmap '01001000011100' to the eMBB terminal. The eMBB terminal receiving the PR or PI may determine that the URLLC data is transmitted through B2, B7, B8, and B9 in the RDR. Accordingly, the eMBB terminal may exclude the URLLC data obtained through B2, B7, B8, and B9 in the RDR in the decoding procedure of the eMBB data.

In the embodiment shown in FIG. 9C, the mode index in the bitmap may be set to '10' and the preempted resource indicator in the bitmap may be set to '001011000000'. In this case, the base station may transmit the PR or the PI including the bitmap '10001011000000' to the eMBB terminal. The eMBB terminal receiving the PR or PI may determine that the URLLC data is transmitted through B2, B4, and B5 in the RDR. Accordingly, the eMBB terminal may exclude the URLLC data obtained through B2, B4, and B5 in the RDR in the decoding procedure of the eMBB data.

In the embodiment shown in FIG. 9D, the mode index in the bitmap may be set to '11' and the preempted resource indicator in the bitmap may be set to '100100110000'. In this case, the base station may transmit the PR or the PI including the bitmap '11100100110000' to the eMBB terminal. The eMBB terminal receiving the PR or PI may determine that the URLLC data is transmitted through B0, B3, B6, and B7 in the RDR. Accordingly, the eMBB terminal may exclude the URLLC data obtained through B0, B3, B6, and B7 in the RDR in the decoding procedure of the eMBB data.

The embodiments described above with reference to FIGS. 8A to 8D and the embodiments described with reference to FIGS. 9A to 9D may be applied to one or more slots or one or more mini-slots, and may be applied to not only downlink transmission but also uplink transmission.

When the separate PR is not used and the bitmap indicating the URLLC resource is included in the PI, the PI may indicate the URLLC resource in units of a plurality of slots (or a plurality of mini-slots). In this case, since the monitoring periodicity of the PI increases, the complexity and power consumption of the eMBB terminal performing the monitoring operation for PI detection may be reduced. When the number of slots indicated by the PI is M and the size of the bitmap indicating the URLLC resource in each of the M slots is N bits, the total size of the bitmap indicating the URLLC resource in the M slots may be M×N bits. Here, each of N and M may be an integer equal to or greater than 1.

The monitoring period of the PI may be configured according to the number of slots indicated by the PI, and the base station may inform the eMBB terminal of information indicating the monitoring period of the PI. Therefore, even when the total size of the bitmap indicating the URLLC resources is changed according to the number of the slots indicated by the PI, the eMBB terminal may estimate the size of the PI based on the monitoring period of the PI, so that the complexity to obtain the PI related information may not increase.

Alternatively, the PI may include a sum (e.g., union) of bitmaps each of which indicates URLLC resources in each of a plurality of slots. In this case, the size of the bitmap indicating the URLLC resources does not increase according to the number of the slots indicated by the PI, but the accuracy of the information indicated by the bitmap (e.g., whether or not the URLLC resource is allocated) may be degraded.

Figure 10:
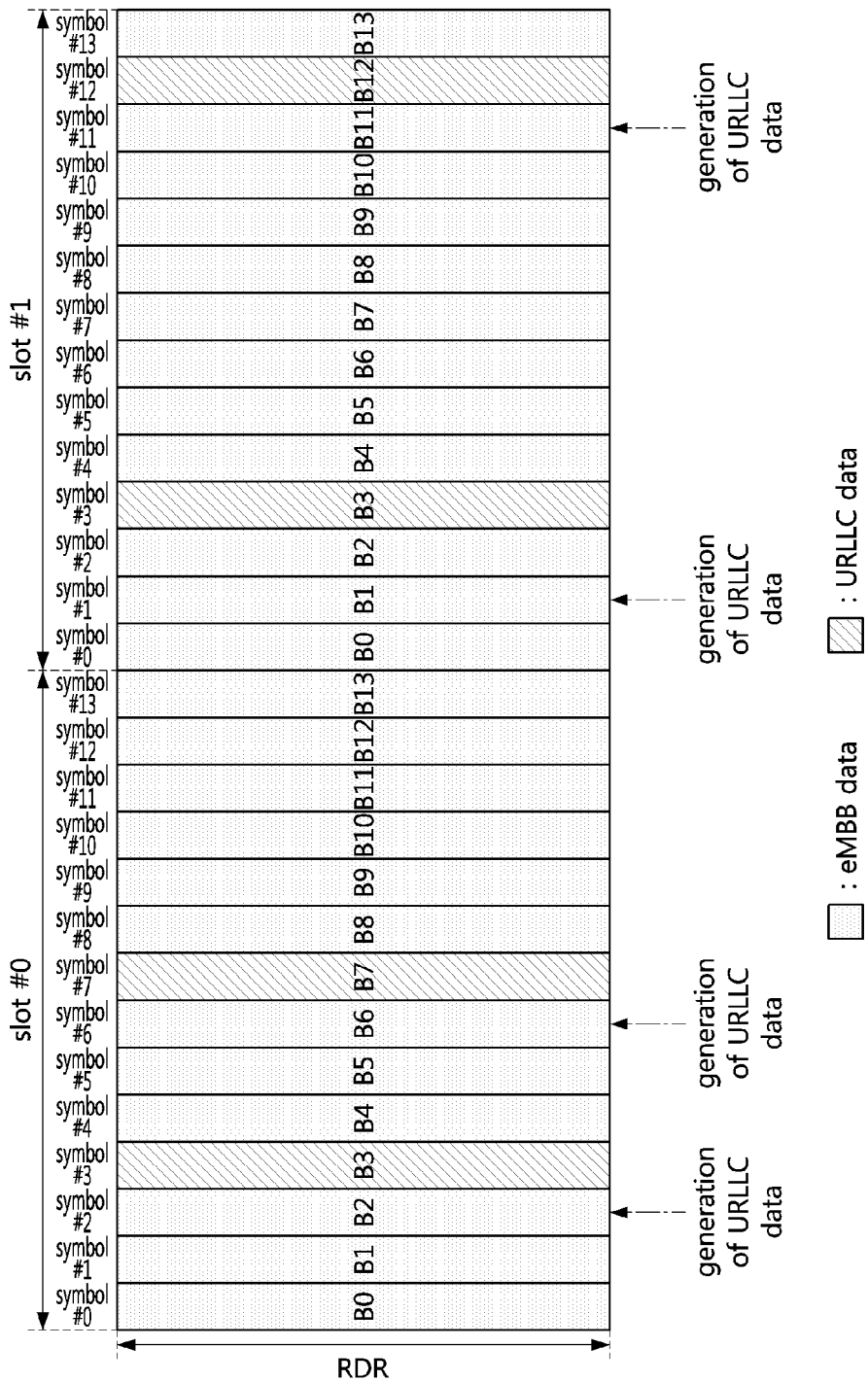
FIG. 10 is a conceptual diagram illustrating a first embodiment of a method of indicating URLLC resources in a plurality of slots in a communication system.

FIG. 10 is a conceptual diagram illustrating a first embodiment of a method of indicating URLLC resources in a plurality of slots in a communication system.

Referring to FIG. 10, a PI may indicate URLLC resources in 2 slots. Here, each of the slots may include 14 symbols. Since B3 and B7 in the slot #0 are configured as URLLC resources, a preempted resource indicator in a bitmap #0 indicating URLLC resources in the slot #0 may be set to '00010001000000'. When the bitmap #0 includes a mode index and the preempted resource indicator, the bitmap #0 may be set to '0000010001000000'. Since B3 and B12 in the slot #1 are configured as URLLC resources, a preempted resource indicator in a bitmap #1 indicating URLLC resources in the slot #1 may be set to '00010000000010'. When the bitmap #1 includes a mode index and the preempted resource indicator, the bitmap #1 may be set to '0000010000000010'. A sum of the preempted resource indicator in the bitmap #0 and the preempted resource indicator in the bitmap #1 may be defined as shown in Table 3 below.

TABLE 3

|  | B0 | B1 | B2 | B3 | B4 | B5 | B6 | B7 | B8 | B9 | B10 | B11 | B12 | B13 |
|---|---|---|---|---|---|---|---|---|---|---|---|---|---|---|
| Bitmap #0 | 0 | 0 | 0 | 1 | 0 | 0 | 0 | 1 | 0 | 0 | 0 | 0 | 0 | 0 |
| Bitmap #1 | 0 | 0 | 0 | 1 | 0 | 0 | 0 | 0 | 0 | 0 | 0 | 0 | 1 | 0 |
| Sum | 0 | 0 | 0 | 1 | 0 | 0 | 0 | 1 | 0 | 0 | 0 | 0 | 1 | 0 |

When the bitmap is composed of 'mode index+sum of preempted resource indicators', the corresponding bitmap may be set to '0000010001000010'. Further, the bitmap may further include a 'slot indicator' indicating whether a preemption occurs in the slots indicated by the PI (e.g., whether or not the URLLC resource is configured). When the number of slots indicated by the PI is M, the size of the slot indicator may be M bits. Here, M may be an integer equal to or greater than 1.

In the slot indicator, a bit set to '0' may indicate that no preemption has occurred in the corresponding slot, and a bit set to '1' may indicate that the preemption has occurred in the corresponding slot. When the number of slots indicated by the PI is 2 and the URLLC resources are configured in the slots #0 and #1, the slot indicator may be set to '11'. Accordingly, when the bitmap is configured as 'slot indicator+mode index+sum of preempted resource indicators', the corresponding bitmap may be set to '1100000100010000010'.

On the other hand, B12 in the slot #0 is not used for transmission of URLLC data, but eMBB data obtained from B12 in the slot #0 is excluded in the decoding procedure of the eMBB data received through the slot #0, so that the decoding performance may be degraded. Also, B7 in the slot #1 is not used for transmission of URLLC data, but eMBB data obtained from B7 in the slot #1 is excluded in the decoding procedure of the eMBB data received through the slot #1, so that the decoding performance may be degraded. In order to reduce such the degradation of decoding performance, it is desirable that patterns of URLLC resources in the slots are maintained the same.

In case that B3 of the slot #0 has been preempted for transmission of URLLC data occurring in the symbol #2 of the slot #0 and B7 of the slot #0 has been preempted for transmission of URLLC data occurring in the symbol #6 of the slot #0, even when URLLC data occurs in the symbol #1 of the slot #1, in order to make the patterns of URLLC resources in the slots #0 and #1 as equal as possible, the base station may preempt B3 of the slot #1 instead of B2 of the slot #1 as long as the requirements of the URLLC service are satisfied. When URLLC data occurs in the symbol #11 of the slot #1 and it's difficult to make the patterns of URLLC resources equal while satisfying the requirements of the URLLC service, the base station may preempt B12 of the slot #1.

On the other hand, the monitoring period of the PI may vary, and the number of slots indicated by the PI may also be changed according to the monitoring period of the PI. For example, if the monitoring period of the PI is 2 slots, the number of slots indicated by the PI may be 2, in which case the size of the slot indicator in the PI may be 2 bits. Alternatively, if the monitoring period of the PI is 4 slots, the number of slots indicated by the PI may be 4, in which case the size of the slot indicator in the PI may be 4 bits. That is, the size of the PI may be changed according to the monitoring period of the PI.

In order to solve the above problem, the size of the slot indicator in the PI may be fixed to the number of slots corresponding to the maximum monitoring periodicity of the PI. For example, when the number of slots corresponding to the maximum monitoring periodicity of the PI is 4, the size of the slot indicator in the PI may be 4 bits. In this case, the slot indicator according to the monitoring periodicity of the PI may be configured as follows.

Figure 11A:
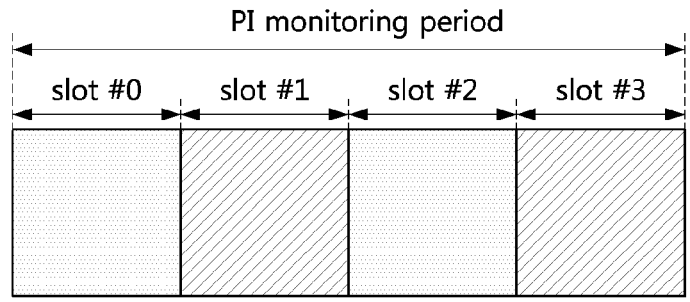
FIG. 11A is a conceptual diagram illustrating a first embodiment of a slot indicator according to a monitoring periodicity in a communication system.
Figure 11B:
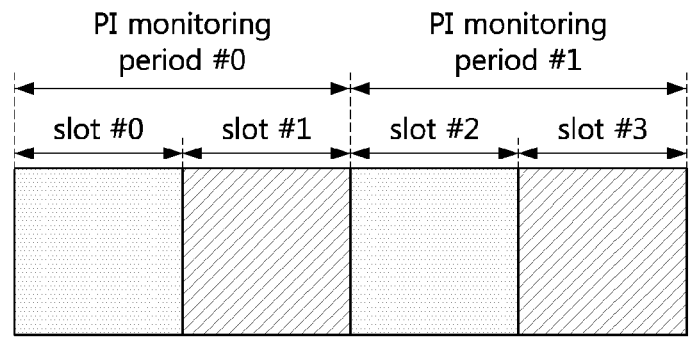
FIG. 11B is a conceptual diagram illustrating a second embodiment of a slot indicator according to a monitoring periodicity in a communication system.
Figure 11C:
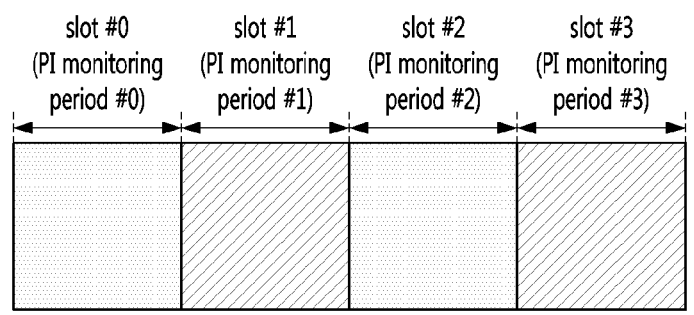
FIG. 11C is a conceptual diagram illustrating a third embodiment of a slot indicator according to a monitoring periodicity in a communication system.

FIG. 11A is a conceptual diagram illustrating a first embodiment of a slot indicator according to a monitoring periodicity in a communication system, FIG. 11B is a conceptual diagram illustrating a second embodiment of a slot indicator according to a monitoring periodicity in a communication system, and FIG. 11C is a conceptual diagram illustrating a third embodiment of a slot indicator according to a monitoring periodicity in a communication system.

Referring to FIGS. 11A to 11C, when the number of slots corresponding to the maximum monitoring period of the PI is 4, the size of the slot indicator in the PI may be 4 bits. In this case, the slot indicator in the PI may be set to ($b_0$ $b_1$ $b_2$ $b_3$), and each of $b_0$, $b_1$, $b_2$, and $b_3$ may be one bit.

In the embodiment shown in FIG. 11A, when the number of slots corresponding to the maximum monitoring period of the PI is 4, $b_0$ may indicate whether the URLLC resource is allocated in the first slot (e.g., slot #0) within the monitoring period of the PI, $b_1$ may indicate whether the URLLC resource is allocated in the second slot (e.g., slot #1) within the monitoring period of the PI, $b_2$ may indicate whether the URLLC resource is allocated in the third slot (e.g., slot #2) within the monitoring period of the PI, and $b_3$ may indicate whether the URLLC resource is allocated in the fourth slot (e.g., slot #3) within the monitoring period of the PI. In this case, the slot indicator in the PI may be set to '0101'.

In the embodiment shown in FIG. 11B, when the number of slots corresponding to the maximum monitoring period of the PI is 2, $b_0$ and $b_1$ may be set to '0'. That is, $b_0$ and $b_1$ may not be used for indicating whether the URLLC resource is allocated. $b_2$ may indicate whether the URLLC resource is allocated in the first slot within the monitoring period of the PI, and $b_3$ may indicate whether the URLLC resource is allocated in the second slot within the monitoring period of the PI. In this case, the slot indicator in the PI for a monitoring period #0 may be set to '0001', and the slot indicator in the PI for a monitoring period #1 may be set to '0001'.

In the embodiment shown in FIG. 11C, when the number of slots corresponding to the maximum monitoring period of the PI is 1, $b_0$, $b_1$, and $b_2$ may be set to '0'. That is, $b_0$, $b_1$, and $b_2$ may not be used for indicating whether the URLLC resource is allocated. $b_3$ may indicate whether the URLLC resource is allocated in the slot within the monitoring period of the PI. In this case, the slot indicator in the PI for a monitoring period #0 may be set to '0000', the slot indicator in the PI for a monitoring period #1 may be set to '0001', the slot indicator in the PI for a monitoring period #2 may be set to '0000', and the slot indicator in the PI for a monitoring period #3 may be set to '0001'.

According to the method described above, the size of the PI may always be kept the same regardless of the monitoring period of the PI. Also, the above-described method may be applied even when the monitoring period of the PI is configured in a unit smaller than the slot (e.g., a mini-slot, a symbol).

On the other hand, since the requirements of the eMBB service are different from those of the URLLC service, system parameters (e.g., subcarrier spacing) used for transmission of the eMBB data may be different from system parameters (e.g., subcarrier spacing) used for transmission of the URLLC data. When some time-frequency resources among the eMBB resources are preempted for transmission of the URLLC data, and the subcarrier spacing used for the eMBB service is different from the subcarrier spacing used for the URLLC service, a method of configuring a preempted time-frequency resource (e.g., URLLC resource) is required. For example, the PI may be configured according to the subcarrier spacing used for the eMBB service, and the preempted time-frequency resource (e.g., URLLC resource) may be configured according to the subcarrier spacing used for the URLLC service.

Figure 12:
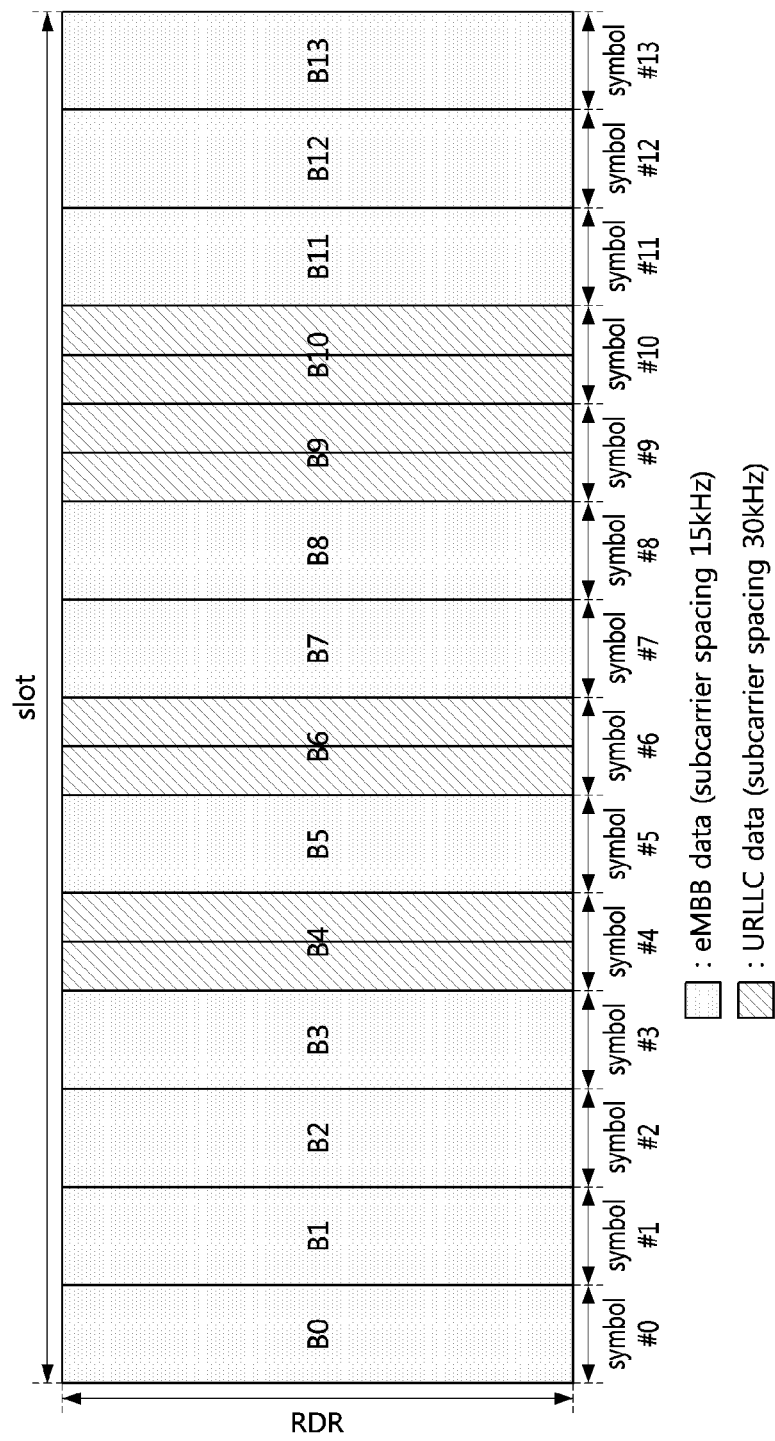
FIG. 12 is a conceptual diagram illustrating a first embodiment of a method of configuring a URLLC resource in a communication system.

FIG. 12 is a conceptual diagram illustrating a first embodiment of a method of configuring a URLLC resource in a communication system.

Referring to FIG. 12, B0 to B13 in the RDR may be configured as eMBB resources, and B4, B6, B9, and B10 among B0 to B13 may be preempted for transmission of URLLC data when the URLLC data occurs. That is, B4, B6, B9, and B10 may be configured as URLLC resource.

When the subcarrier spacing used for transmission of the eMBB data is 15 kHz, the subcarrier spacing used for transmission of the URLLC data is 30 kHz, and the unit of the eMBB resources indicated by one bit of the bitmap included in the PI is 1 (e.g., symbol granularity of the eMBB resource=1 symbol), the unit of the URLLC resources indicated by one bit of the bitmap included in the PI may be (30 kHz/15 kHz)×1) symbols. That is, the symbol granularity of the URLLC resource may be 2 symbols. The symbol granularity of the URLLC resources may be calculated based on Equation 1 below.

$$T_{URLLC}=(N_{URLLC}/N_{eMBB}) \times T_{eMBB} \quad \text{[Equation 1]}$$

The $T_{URLLC}$ may indicate the symbol granularity of the URLLC resources, the $T_{eMBB}$ may indicate the symbol granularity of the eMBB resources, the $N_{URLLC}$ may indicate the subcarrier spacing used for transmission of the URLLC data, and the $N_{eMBB}$ may indicate the subcarrier spacing used for transmission of the eMBB data.

When the RDR includes a plurality of PRBs or one or more PRB groups in the frequency axis, the URLLC resources in the frequency axis may be configured based on a ratio of the subcarrier spacing used for transmission of the eMBB data to the subcarrier spacing used for transmission of the URLLC data. When the subcarrier spacing used for transmission of the eMBB data is 15 kHz, the subcarrier spacing used for transmission of the URLLC data is 30 kHz, and the unit of the eMBB resources indicated by one bit of the bitmap included in the PI is 50 PRBs (e.g., PRB granularity of the eMBB resource=50 PRBs), the unit of the URLLC resources indicated by one bit of the bitmap included in the PI may be (15 kHz/30 kHz)×50) PRBs. That is, the PRB granularity of the URLLC resource may be 25 PRBs. The PRB granularity of the URLLC resources may be calculated based on Equation 2 below.

$$F_{URLLC}=(N_{eMBB}/N_{URLLC}) \times F_{eMBB} \quad \text{[Equation 2]}$$

The $F_{URLLC}$ may indicate the PRB granularity of the URLLC resources, the $F_{eMBB}$ may indicate the PRB granularity of the eMBB resources, the $N_{URLLC}$ may indicate the subcarrier spacing used for transmission of the URLLC data, and the $N_{eMBB}$ may indicate the subcarrier spacing used for transmission of the eMBB data. When $N_{eMBB}$ is not divided by $N_{URLLC}$, a flow function may be applied to Equation 2.

Meanwhile, when the resource preemption is required according to the occurrence of URLLC data, time-frequency resources used for transmission of important signals and channels may not be preempted. The demodulation reference signal (DMRS) used for demodulating data in the NR system may be located in the front region within the slot. The DMRS located in the front region within the slot may be referred to as 'front-loaded DMRS'. For example, a starting point of the front-loaded DMRS may be a symbol #2 or a symbol #3 in the slot. The transmission position of the front-loaded DMRS may be transmitted through an SS block (e.g., SS/PBCH block).

Also, the number of symbols used for transmission of the front-loaded DMRS may vary depending on the number of antenna ports. For example, the front-loaded DMRS may be transmitted using one symbol or two symbols. In addition to the front-loaded DMRS, additional DMRS may be configured. The additional DMRS may be allocated to a symbol located after the symbols to which the front-loaded DMRS is assigned in the slot. The additional DMRS may be used to improve channel estimation performance. The transmission of additional DMRS may be omitted, but the front-loaded DMRS should be transmitted because it is a mandatory DMRS.

Therefore, when the resource preemption is required according to occurrence of the URLLC data, the time-frequency resources used for transmission of the front-loaded DMRS may not be preempted. When the time-frequency resources used for transmission of the front-loaded DMRS overlap with time-frequency resources to be preempted for transmission of the URLLC data, the front-loaded DMRS may be preferentially transmitted using the existing time-frequency resources, and the URLLC data may be transmitted using time-frequency resources (e.g., time-frequency resources used for transmission of normal data) other than the time-frequency resources used for transmission of the front-loaded DMRS.

Figure 13A:
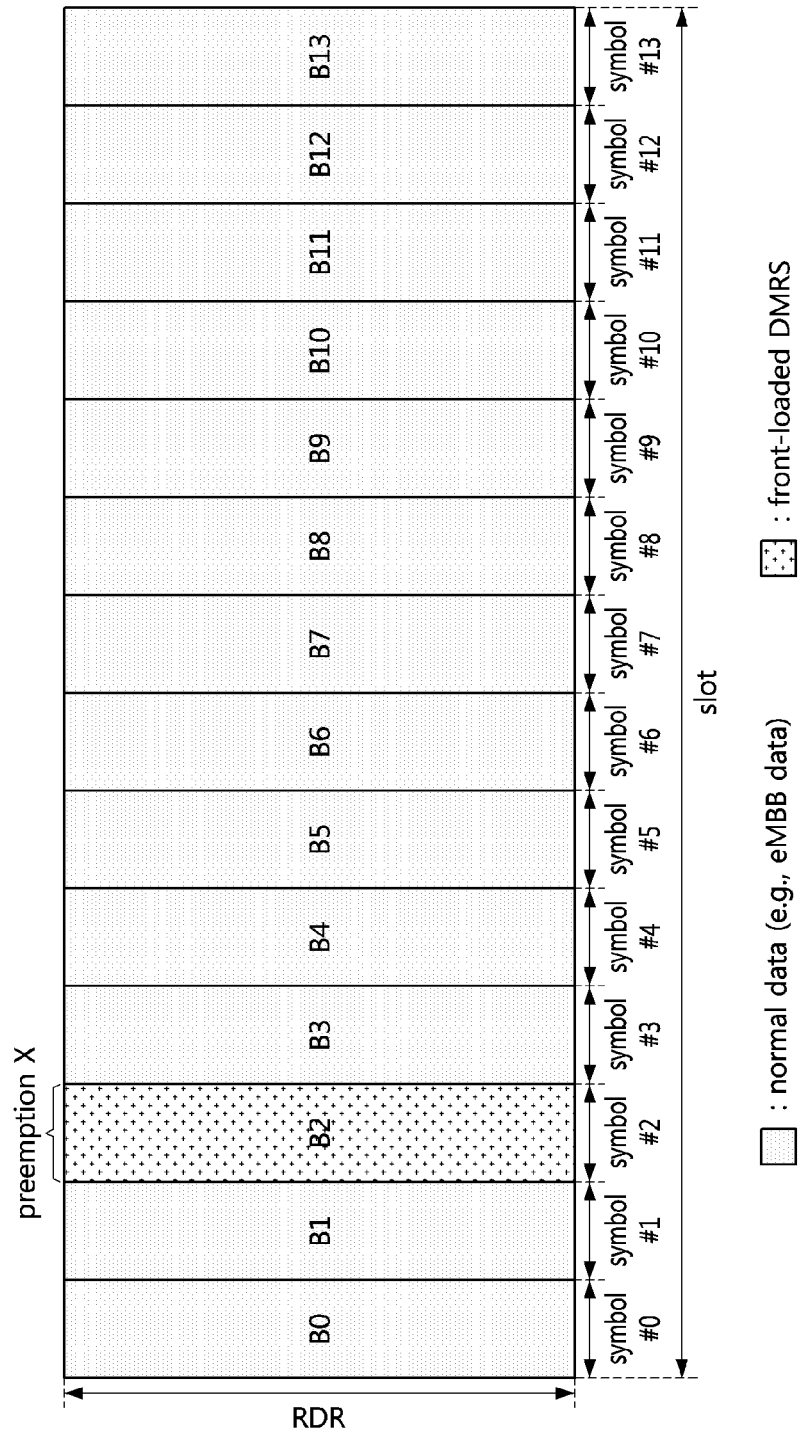
FIG. 13A is a conceptual diagram illustrating a first embodiment of a method of transmitting URLLC data according to a transmission position of a front-loaded DMRS in an RDR configured according to a 'mode 00'.
Figure 13B:
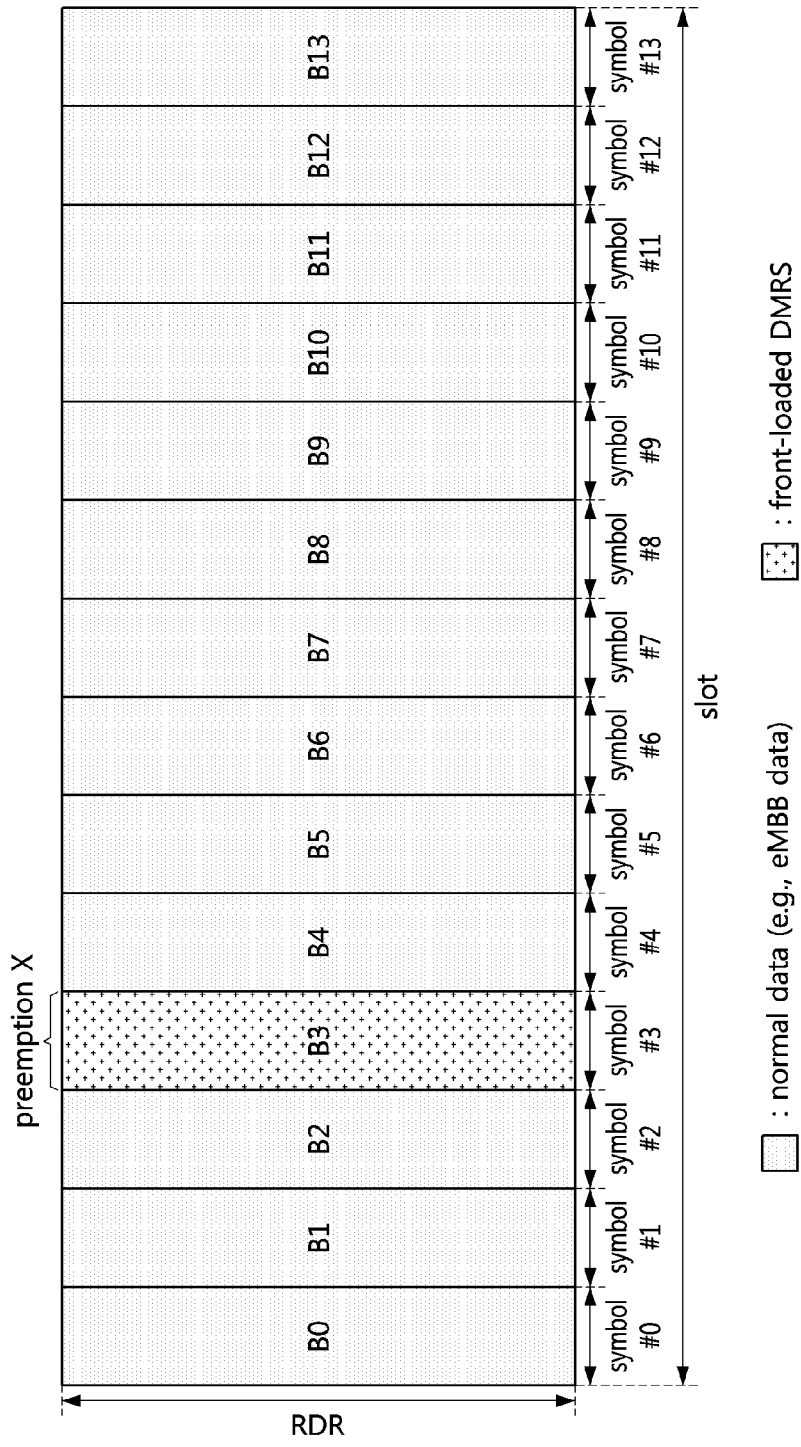
FIG. 13B is a conceptual diagram illustrating a second embodiment of a method of transmitting URLLC data according to a transmission position of a front-loaded DMRS in an RDR configured according to a 'mode 00'.
Figure 13C:
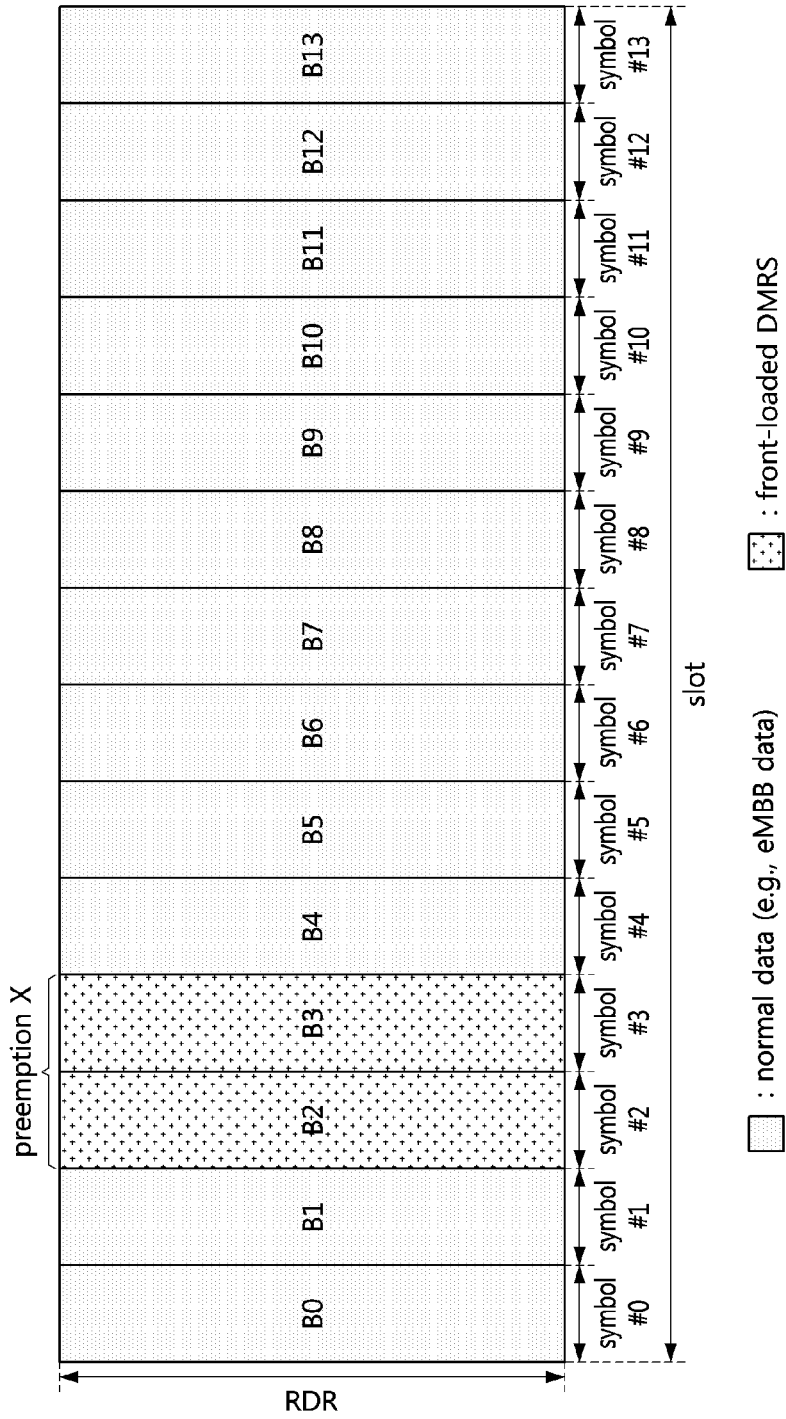
FIG. 13C is a conceptual diagram illustrating a third embodiment of a method of transmitting URLLC data according to a transmission position of a front-loaded DMRS in an RDR configured according to a 'mode 00'.
Figure 13D:
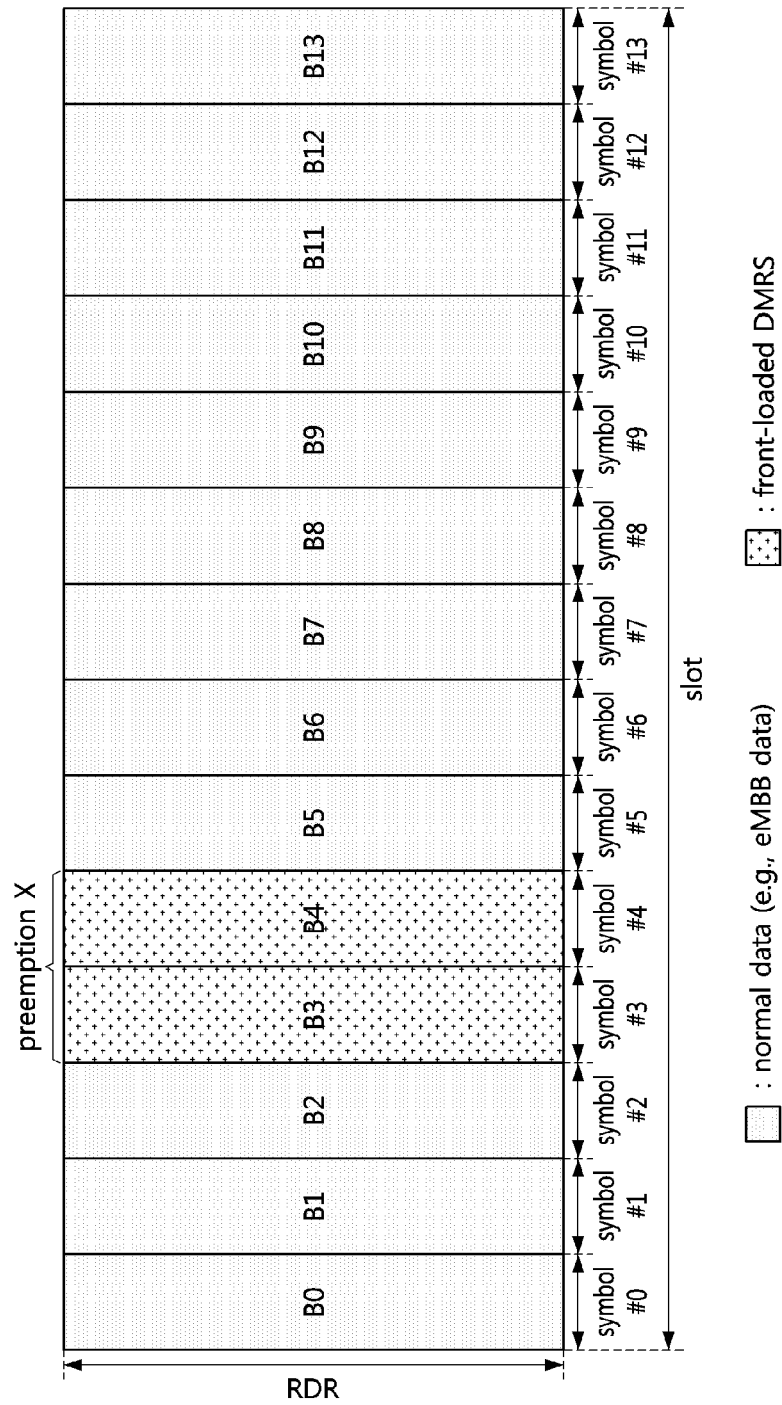
FIG. 13D is a conceptual diagram illustrating a fourth embodiment of a method of transmitting URLLC data according to a transmission position of a front-loaded DMRS in an RDR configured according to a 'mode 00'.

FIG. 13A is a conceptual diagram illustrating a first embodiment of a method of transmitting URLLC data according to a transmission position of a front-loaded DMRS in an RDR configured according to a 'mode 00', FIG. 13B is a conceptual diagram illustrating a second embodiment of a method of transmitting URLLC data according to a transmission position of a front-loaded DMRS in an RDR configured according to a 'mode 00', FIG. 13C is a conceptual diagram illustrating a third embodiment of a method of transmitting URLLC data according to a transmission position of a front-loaded DMRS in an RDR configured according to a 'mode 00', and FIG. 13D is a conceptual diagram illustrating a fourth embodiment of a method of transmitting URLLC data according to a transmission position of a front-loaded DMRS in an RDR configured according to a 'mode 00'.

Referring to FIGS. 13A to 13D, when an RDR is configured according to the mode 00, a preemption unit in the time axis may be one symbol. In the embodiment shown in FIG. 13A, a front-loaded DMRS may be transmitted using a symbol #2 (e.g., B2) in a slot, and the base station may configure B2 not to be preempted for transmission of URLLC data. Therefore, even when the preemption of B2 is required due to occurrence of URLLC data before the symbol #2, B2 may not be preempted for transmission of the URLLC data, and a time-frequency resource (e.g., B3) located after B2 may be preempted for transmission of the URLLC data.

In the embodiment shown in FIG. 13B, a front-loaded DMRS may be transmitted using a symbol #3 (e.g., B3) in a slot, and the base station may configure B3 not to be preempted for transmission of URLLC data. Therefore, even when the preemption of B3 is required due to occurrence of URLLC data before the symbol #3, B3 may not be preempted for transmission of the URLLC data, and a time-frequency resource (e.g., B4) located after B3 may be preempted for transmission of the URLLC data.

In the embodiment shown in FIG. 13C, a front-loaded DMRS may be transmitted using symbols #2 to #3 (e.g., B2 and B3) in a slot, and the base station may configure B2 and B3 not to be preempted for transmission of URLLC data. Therefore, even when the preemption of B2 and B3 is required due to occurrence of URLLC data before the symbol #2, B2 and B3 may not be preempted for transmission of the URLLC data, and a time-frequency resource (e.g., B4) located after B3 may be preempted for transmission of the URLLC data.

In the embodiment shown in FIG. 13D, a front-loaded DMRS may be transmitted using symbols #3 to #4 (e.g., B3 and B4) in a slot, and the base station may configure B3 and B4 not to be preempted for transmission of URLLC data. Therefore, even when the preemption of B3 and B4 is required due to occurrence of URLLC data before the symbol #3, B3 and B4 may not be preempted for transmission of the URLLC data, and a time-frequency resource (e.g., B5) located after B4 may be preempted for transmission of the URLLC data.

Figure 14A:
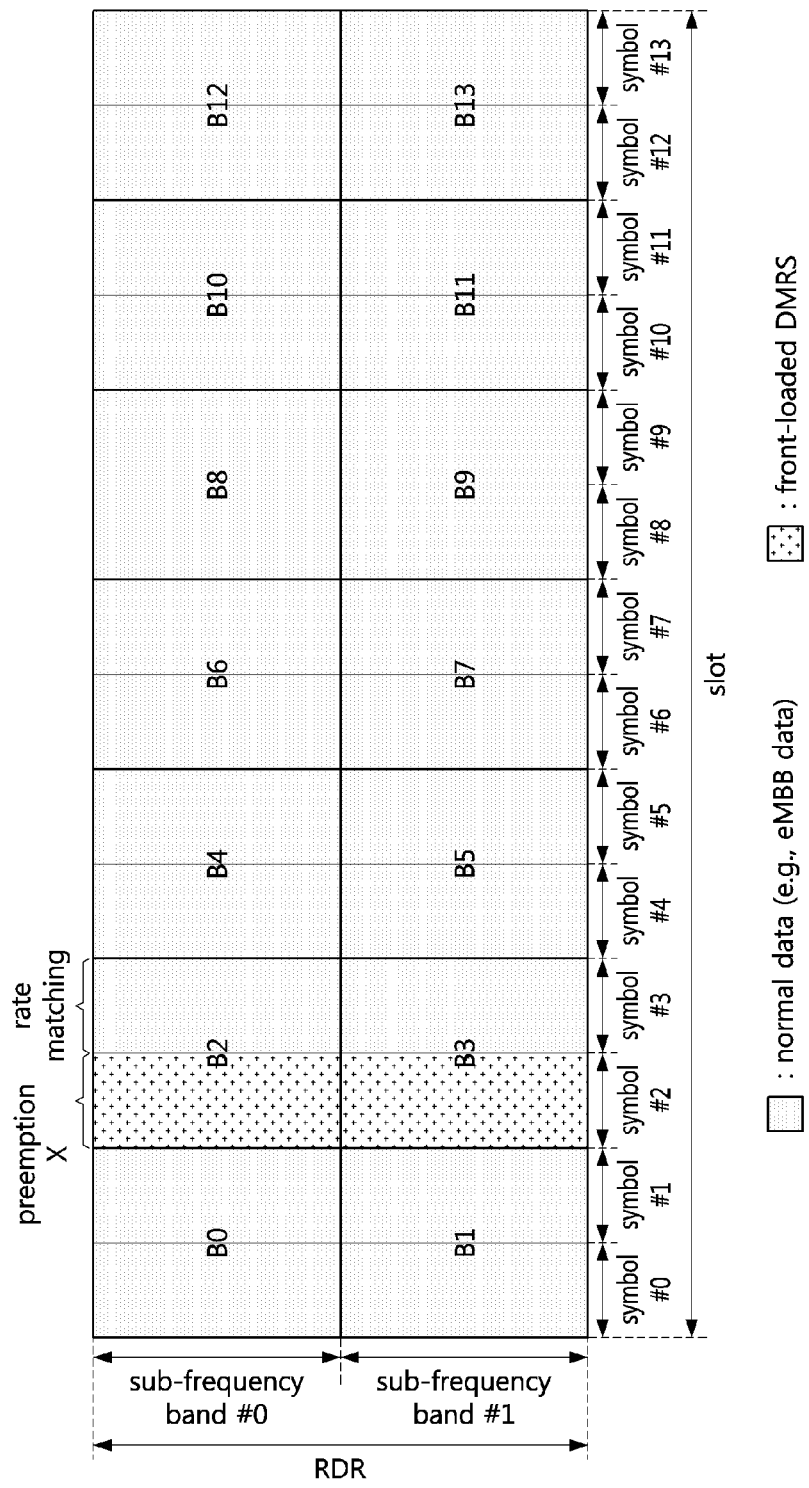
FIG. 14A is a conceptual diagram illustrating a first embodiment of a method of transmitting URLLC data according to a transmission position of a front-loaded DMRS in an RDR configured according to a 'mode 01'.
Figure 14B:
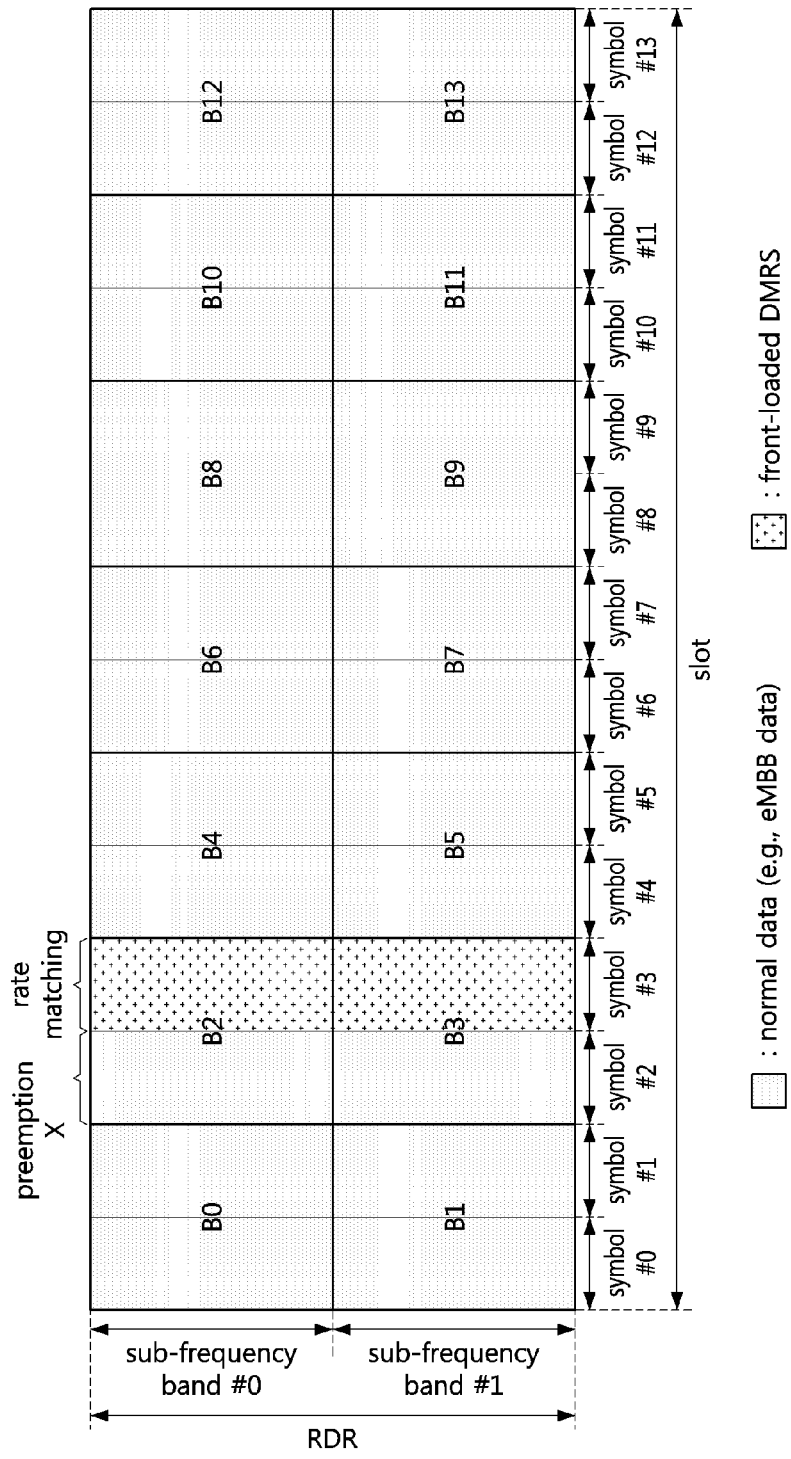
FIG. 14B is a conceptual diagram illustrating a second embodiment of a method of transmitting URLLC data according to a transmission position of a front-loaded DMRS in an RDR configured according to a 'mode 01'.
Figure 14C:
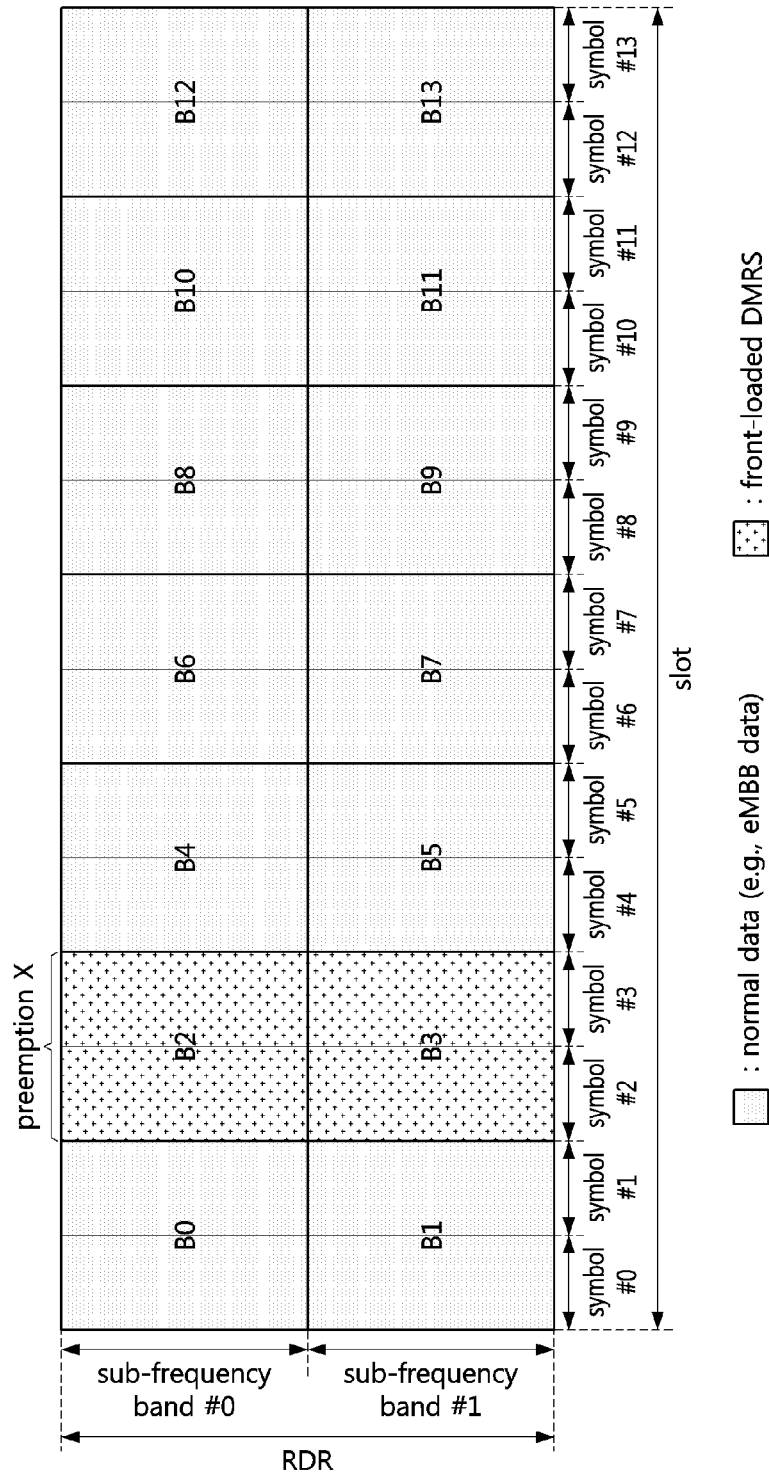
FIG. 14C is a conceptual diagram illustrating a third embodiment of a method of transmitting URLLC data according to a transmission position of a front-loaded DMRS in an RDR configured according to a 'mode 01'.
Figure 14D:
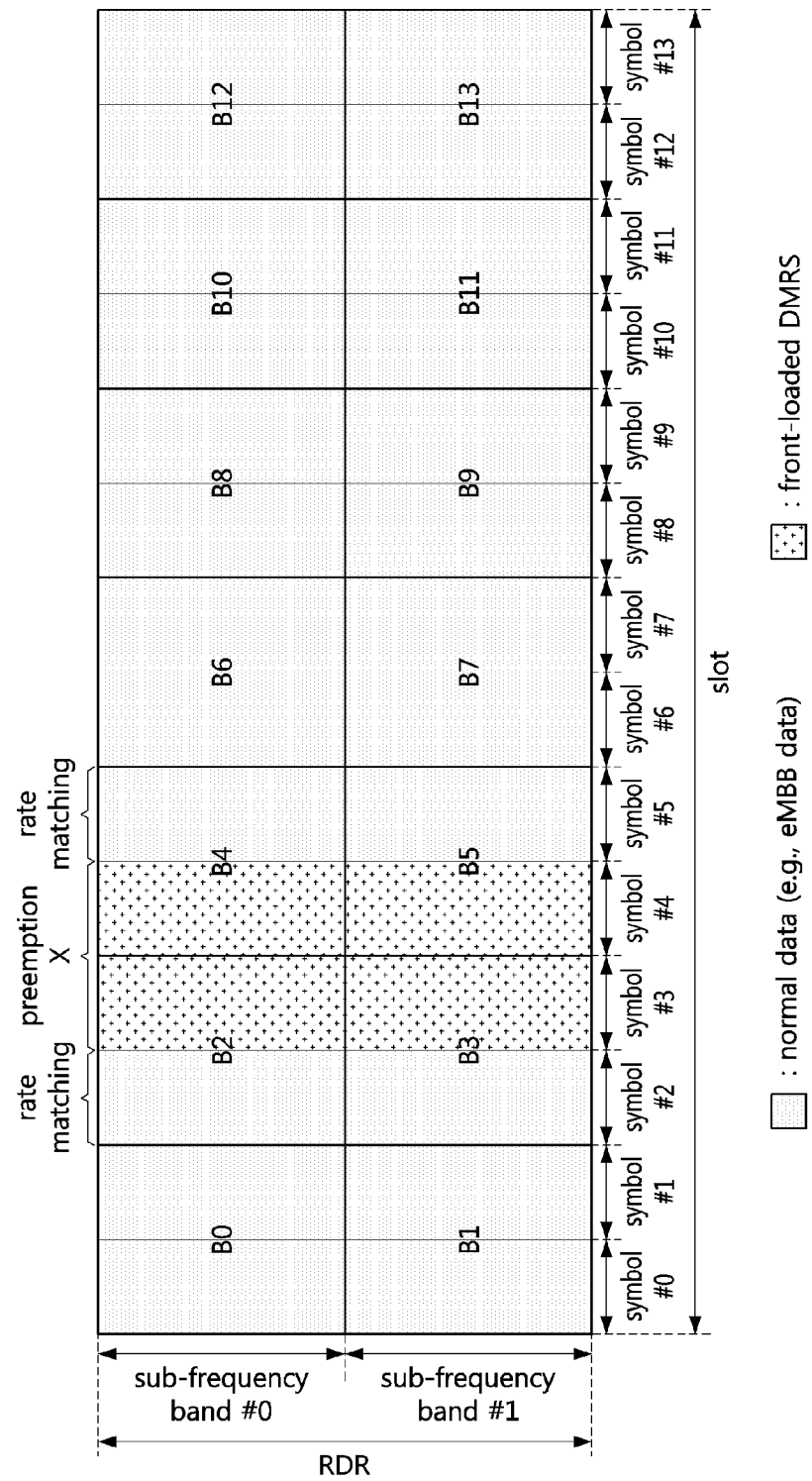
FIG. 14D is a conceptual diagram illustrating a fourth embodiment of a method of transmitting URLLC data according to a transmission position of a front-loaded DMRS in an RDR configured according to a 'mode 01'.

FIG. 14A is a conceptual diagram illustrating a first embodiment of a method of transmitting URLLC data according to a transmission position of a front-loaded DMRS in an RDR configured according to a 'mode 01', FIG. 14B is a conceptual diagram illustrating a second embodiment of a method of transmitting URLLC data according to a transmission position of a front-loaded DMRS in an RDR configured according to a 'mode 01', FIG. 14C is a conceptual diagram illustrating a third embodiment of a method of transmitting URLLC data according to a transmission position of a front-loaded DMRS in an RDR configured according to a 'mode 01', and FIG. 14D is a conceptual diagram illustrating a fourth embodiment of a method of transmitting URLLC data according to a transmission position of a front-loaded DMRS in an RDR configured according to a 'mode 01'.

Referring to FIGS. 14A to 14D, when an RDR is configured according to the mode 01, a preemption unit in the time axis may be 2 symbols, and whether a preemption is applied may be determined at a starting time point of the front-loaded DM-RS.

When the front-loaded DMRS is transmitted using one symbol, only one symbol in a time region (e.g., 'B0+B1', 'B2+B3', 'B4+B5', 'B6+B7', 'B8+B9', 'B10+B11', or 'B12+B13') according to the preemption unit is used for transmission of the front-loaded DMRS, the other symbol may be preempted for transmission of URLLC data. In this case, the URLLC data may be rate-matched to the other symbol in the time region. Accordingly, the transmission of the URLLC data may not be delayed.

However, since the URLLC resources are reduced due to the transmission of the front-loaded DMRS, the URLLC data may be transmitted using a relatively high code rate and a relatively high modulation order, so that the reception performance for the URLLC data may be degraded. The degradation of the reception performance of the URLLC data may be offset by extending the URLLC resources in the frequency axis.

In the embodiment shown in FIG. 14A, a front-loaded DMRS may be transmitted using the symbol #2 in (B2+B3), and the base station may configure the symbol #2 in (B2+B3) not to be preempted for transmission of URLLC data. Therefore, even when the preemption of the symbol #2 in (B2+B3) is required due to occurrence of URLLC data before the symbol #2, the symbol #2 in (B2+B3) may not be preempted for transmission of the URLLC data. However, since the symbol #3 in (B2+B3) is not used for transmission of the front-loaded DMRS, the base station may preempt the symbol #3 in (B2+B3) in order to transmit the URLLC data, rate-match the URLLC data to the symbol #3 in (B2+B3), and transmit the URLLC data using the symbol #3 in (B2+B3).

In the embodiment shown in FIG. 14B, a front-loaded DMRS may be transmitted using the symbol #3 in (B2+B3), and the base station may configure the symbol #3 in (B2+B3) not to be preempted for transmission of URLLC data. Therefore, even when the preemption of (B2+B3) is required due to occurrence of URLLC data before the symbol #2, the symbol #3 in (B2+B3) may not be preempted for transmission of the URLLC data. However, since the symbol #2 in (B2+B3) is not used for transmission of the front-loaded DMRS, the base station may preempt the symbol #2 in (B2+B3) in order to transmit the URLLC data, rate-match the URLLC data to the symbol #2 in (B2+B3), and transmit the URLLC data using the symbol #2 in (B2+B3).

In the embodiment shown in FIG. 14C, a front-loaded DMRS may be transmitted using symbols #2 and #3 in (B2+B3), and the base station may configure the (B2+B3) not to be preempted for transmission of URLLC data. Therefore, even when the preemption of (B2+B3) is required due to occurrence of URLLC data before the symbol #2, the symbol #3 in (B2+B3) may not be preempted for transmission of the URLLC data, and (B4+B5) located after (B2+B3) may be preempted for transmission of the URLLC data.

In the embodiment shown in FIG. 14D, a front-loaded DMRS may be transmitted using the symbol #3 in (B2+B3) and the symbol #4 in (B4+B5), and the base station may configure the symbol #3 in (B2+B3) and the symbol #4 in (B4+B5) not to be preempted for transmission of URLLC data. Therefore, even when the preemption of (B2+B3) is required due to occurrence of URLLC data before the symbol #2, the symbol #3 in (B2+B3) may not be preempted for transmission of the URLLC data. However, since the symbol #2 in (B2+B3) is not used for transmission of the front-loaded DMRS, the base station may preempt the symbol #2 in (B2+B3) in order to transmit the URLLC data, rate-match the URLLC data to the symbol #2 in (B2+B3), and transmit the URLLC data using the symbol #2 in (B2+B3).

Alternatively, even when the preemption of (B4+B5) is required due to occurrence of URLLC data before the symbol #4, the symbol #4 in (B4+B5) may not be preempted for transmission of the URLLC data. However, since the symbol #5 in (B4+B5) is not used for transmission of the front-loaded DMRS, the base station may preempt the symbol #5 in (B4+B5) in order to transmit the URLLC data, rate-match the URLLC data to the symbol #5 in (B4+B5), and transmit the URLLC data using the symbol #5 in (B4+B5).

The starting time point of the front-loaded DMRS may be broadcast through an SS block (e.g., SS/PBCH block), and the number of symbols used for transmission of the front-loaded DM-RS may be configured differently for each terminal according to the number of antenna ports of each terminal. Thus, the base station may transmit control information (e.g., control information for URLLC data) that includes information indicating that the URLLC data is rate-matched. Also, the embodiments described with reference to FIGS. 13A to 13D and FIGS. 14A to 14D may be applied to an RDR configured according to a mode '10' or an RDR configured according to a mode '11'.

On the other hand, according to the density of the front-loaded DMRS, the resources allocated to the front-loaded DMRS may also be preempted for transmission of URLLC data. The front-loaded DMRS may be transmitted using all frequency resources or some frequency resources depending on the number of antenna ports. When the front-loaded DMRS is transmitted using some frequency resources within a specific time interval, the remaining frequency resources not used for transmission of the front-loaded DMRS may be preempted for transmission of URLLC data.

Figure 15:
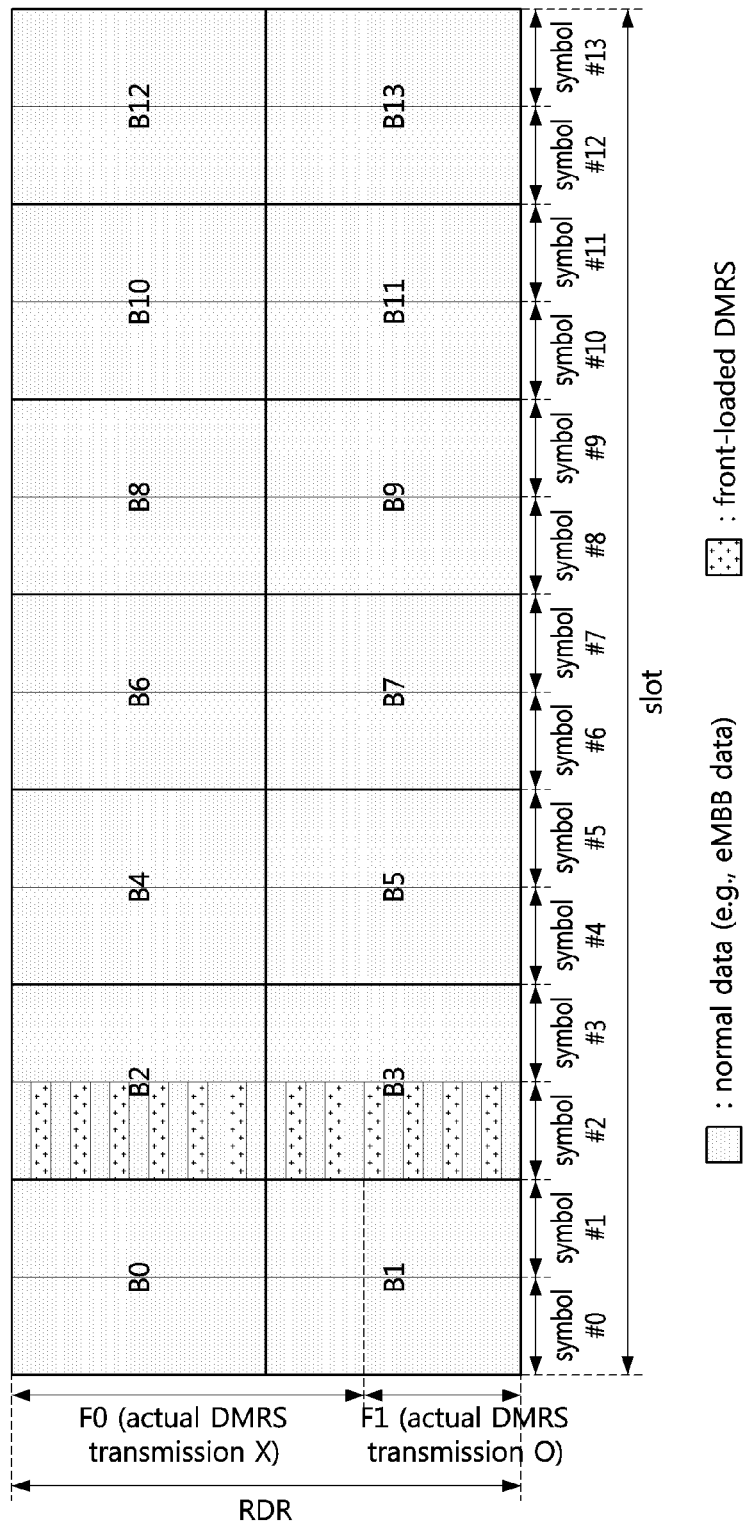
FIG. 15 is a conceptual diagram illustrating a first embodiment of a method for transmitting URLLC data according to a density of front-loaded DMRS.

FIG. 15 is a conceptual diagram illustrating a first embodiment of a method for transmitting URLLC data according to a density of front-loaded DMRS.

Referring to FIG. 15, the symbol #2 in (B2+B3) may be configured as a transmission resource of a front-loaded DMRS. However, the front-loaded DMRS may be transmitted using some frequency resources F1 in the symbol #2, and the remaining frequency resources F0 in the symbol #2 may not be used for transmission of the front-loaded DMRS.

Accordingly, when preemption of (B2+B3) is required due to occurrence of URLLC data before the symbol #2, the some frequency resources F1 in the symbol #2 may not be preempted for transmission of the URLLC data. However, since the remaining frequency resources F0 in the symbol #2 and the symbol #3 in (B2+B3) are not used for transmission of the front-loaded DMRS, the base station may preempt the remaining frequency resources F0 in the symbol #2 and the entire frequency resources F0+F1 in the symbol #3, rate-match the URLLC data to the remaining frequency resources F0 in the symbol #2 and the entire frequency resources F0+F1 in the symbol #3, and transmit the URLLC data using the remaining frequency resources F0 in the symbol #2 and the entire frequency resources F0+F1 in the symbol #3. In this case, the base station may transmit control information (e.g., control information for the URLLC data) indicating that the URLLC data is rate-matched to the remaining frequency resources F0 in the symbol #2 and the entire frequency resources F0+F1 in the symbol #3.

Meanwhile, whether the front-loaded DMRS is transmitted or not, and a transmission pattern of the front-loaded DMRS may differ for each terminal, so that the terminal may perform rate-matching according to the transmission pattern of the front-loaded DMRS even in time-frequency resources in which the front-loaded DMRS is not actually transmitted. In order to solve such the problem, the base station may notify each terminal of whether to transmit the front-loaded DMRS and the transmission pattern of the front-loaded DMRS, in which case a signaling overhead may increase. Therefore, the base station may perform rate matching for URLLC data using the same pattern regardless of whether to transmit the front-loaded DMRS and the transmission pattern of the front-loaded DMRS, and may transmit the rate-matched URLLC data. In this case, the base station may inform the terminal of the same pattern used for the rate matching.

Although the above-described embodiments have been described mainly with respect to the eMBB service, the URLLC service, and the front-loaded DMRS, they may be applied to other services (e.g., mMTC service) and other reference signals (e.g., channel state information-reference signal (CSI-RS), etc.).

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. An operation method of a terminal in a communication system, the operation method comprising:
receiving a first downlink control information (DCI) including resource allocation information from a base station;
performing a receiving operation of data using resources indicated by the resource allocation information, the resources including a first resource and a second resource;
receiving a second DCI including a preemption indication (PI) from the base station; and
assuming that the second resource corresponding to the PI is not used for transmission of the data,
wherein the PI includes a bitmap, each bit included in the bitmap indicates whether or not a resource group corresponding to the each bit among a plurality of resource groups is used for the transmission, a time resource region of the plurality of resource groups associated with the bitmap belongs to a symbol set, and a size of the symbol set is determined based on a ratio of a first subcarrier spacing applied to the plurality of resource groups associated with the bitmap and a second subcarrier spacing applied to a channel where the second DCI is received.

2. The operation method of claim 1, wherein the second resource corresponds to a resource group which is indicated to be not used for the transmission.

3. The operation method of claim 1, further comprising receiving a radio resource control (RRC) message including information on granularity of the plurality of resource groups from the base station.

4. The operation method of claim 3, wherein the plurality of resource groups is configured in a time domain, one bit included in the bitmap is mapped to one resource group among the plurality of resource groups when the information on granularity is set to a first value, and a pair of two bits included in the bitmap is mapped to one resource group among the plurality of resource groups when the information on granularity is set to a second value.

5. The operation method of claim 4, wherein one bit of the pair indicates an upper half of a frequency region in each of the plurality of resource groups, and another bit of the pair indicates a lower half of the frequency region in the each of the plurality of resource groups.

6. The operation method of claim 1, further comprising receiving a RRC message including information on a frequency resource region from the base station, and frequency resources of the plurality of resource groups associated with the bitmap belong to the frequency resource region indicated by the RRC message.

7. The operation method of claim 6, wherein the frequency resource region includes one or more physical resource blocks (PRBs) or one or more bandwidth parts (BWPs).

8. The operation method of claim 1, further comprising receiving a RRC message including information on monitoring periodicity of the second DCI from the base station.

9. The operation method of claim 1, further comprising performing a decoding operation on the data received through the first resource, and data received through the second resource is not used in the decoding operation.

10. An operation method of a base station in a communication system, the operation method comprising:
transmitting a first downlink control information (DCI) including resource allocation information to a terminal;
transmitting data using a first resource among resources indicated by the resource allocation information to the terminal, the resources including the first resource and a second resource; and
transmitting a second DCI including a preemption indication (PI) to the terminal,
wherein the second resource corresponding to the PI is not used for transmission of the data, the PI includes a bitmap, each bit included in the bitmap indicates whether or not a resource group corresponding to the each bit among a plurality of resource groups is used for the transmission, a time resource region of the plurality of resource groups associated with the bitmap belongs to a symbol set, and a size of the symbol set is determined based on a ratio of a first subcarrier spacing applied to the plurality of resource groups associated with the bitmap and a second subcarrier spacing applied to a channel where the second DCI is received.

11. The operation method of claim 10, wherein the second resource corresponds to a resource group which is indicated to be not used for the transmission.

12. The operation method of claim 10, further comprising transmitting a radio resource control (RRC) message including information on granularity of the plurality of resource groups to the terminal.

13. The operation method of claim 12, wherein the plurality of resource groups is configured in a time domain, one bit included in the bitmap is mapped to one resource group among the plurality of resource groups when the information on granularity is set to a first value, and a pair of two bits included in the bitmap is mapped to one resource group among the plurality of resource groups when the information on granularity is set to a second value.

14. The operation method of claim 13, wherein one bit of the pair indicates an upper half of a frequency region in each of the plurality of resource groups, and another bit of the pair indicates a lower half of the frequency region in the each of the plurality of resource groups.

15. The operation method of claim 10, further comprising transmitting a RRC message including information on a frequency resource region to the terminal, and frequency resources of the plurality of resource groups associated with the bitmap belong to the frequency resource region indicated by the RRC message.

16. The operation method of claim 15, wherein the frequency resource region includes one or more physical resource blocks (PRBs) or one or more bandwidth parts (BWPs).

17. The operation method of claim 10, further comprising transmitting a RRC message including information on monitoring periodicity of the second DCI to the terminal.

\* \* \* \* \*